(12) United States Patent
Foss et al.

(10) Patent No.: US 9,946,234 B2
(45) Date of Patent: Apr. 17, 2018

(54) CONTROL OF FLOW NETWORKS

(71) Applicant: NORWEGIAN UNIVERSITY OF SCIENCE AND TECHNOLOGY (NTNU), Trondheim (NO)

(72) Inventors: Bjarne Foss, Trondheim (NO); Vidar Gunnerud, Trondheim (NO)

(73) Assignee: Norwegian University of Science and Technology (NTNU), Trondheim (NO)

( * ) Notice: Subject to any disclaimer, the term of this patent is extended or adjusted under 35 U.S.C. 154(b) by 113 days.

(21) Appl. No.: 14/780,882

(22) PCT Filed: Apr. 17, 2014

(86) PCT No.: PCT/EP2014/057881
§ 371 (c)(1),
(2) Date: Sep. 28, 2015

(87) PCT Pub. No.: WO2014/170425
PCT Pub. Date: Oct. 23, 2014

(65) Prior Publication Data
US 2016/0054713 A1  Feb. 25, 2016

(30) Foreign Application Priority Data
Apr. 17, 2013 (GB) .................................. 1306967.9

(51) Int. Cl.
*G05B 13/04* (2006.01)
*E21B 41/00* (2006.01)
(Continued)

(52) U.S. Cl.
CPC ............ *G05B 13/041* (2013.01); *E21B 41/00* (2013.01); *E21B 43/00* (2013.01); *E21B 43/34* (2013.01)

(58) Field of Classification Search
CPC ...... G05B 13/041; G05D 7/00; G05D 7/0113; G05D 7/0133; G05D 7/0611;
(Continued)

(56) References Cited

U.S. PATENT DOCUMENTS 3,559,476 A   2/1971  Kuo
3,908,454 A   9/1975  Mullins et al.
(Continued)

FOREIGN PATENT DOCUMENTS

GB    2235540 A      3/1991
NO     325614 B1     6/2008
WO  2007116006 A1   10/2007

OTHER PUBLICATIONS

International Search Report and Written Opinion dated Jul. 16, 2013 (PCT/EP2012/072897); ISA/EP.
(Continued)

*Primary Examiner* — Dennis M Butler
(74) *Attorney, Agent, or Firm* — Banner & Witcoff, Ltd.

(57) ABSTRACT

A method for control of a flow network in order to improve the performance of the flow network comprises: (a) applying predetermined excitations at multiple control points within the flow network, wherein the multiple control points are at different branches of the flow network; (b) receiving measurements of changes in one or more flow parameter(s) in one or more flow path(s) in which flows of more than one of the different branches have been combined; (c) carrying out an analysis of the flow parameter measurements to identify variations induced by the applied excitations; (d) determining an adjustment to be made at one or more of the control point(s) in order to improve the performance of the flow network, for example by building and solving an optimization model; (e) making the determined adjustment to the control point(s) of the flow network or making an alternative adjustment decided upon by the flow network operator; and (Continued)

(f) repeating steps (a) to (e) one or more times to thereby iteratively improve the performance of the flow network.

20 Claims, 13 Drawing Sheets

(51) Int. Cl.
 *E21B 43/34* (2006.01)
 *E21B 43/00* (2006.01)

(58) Field of Classification Search
 CPC .. G05D 7/0635; G05D 7/0641; G05D 7/0658; G05D 7/0688; G05D 16/00; G05D 16/02; G05D 16/2026; E21B 41/00; E21B 43/00; E21B 43/003; E21B 43/12; E21B 43/122; E21B 43/25; E21B 43/34
 See application file for complete search history.

(56) References Cited

U.S. PATENT DOCUMENTS

| | | | |
|---|---|---|---|
| 4,458,245 | A | 7/1984 | Crosnier et al. |
| 5,144,590 | A | 9/1992 | Chon |
| 5,220,504 | A | 6/1993 | Holzhausen et al. |
| 5,662,165 | A | 9/1997 | Tubel et al. |
| 6,333,700 | B1 | 12/2001 | Thomeer et al. |
| 6,650,280 | B2 | 11/2003 | Arndt et al. |
| 6,724,687 | B1 | 4/2004 | Stephenson et al. |
| 6,920,085 | B2 | 7/2005 | Finke et al. |
| 8,261,819 | B1 | 9/2012 | Gibbs et al. |
| 2002/0027004 | A1 | 3/2002 | Bussear et al. |
| 2002/0082815 | A1 | 6/2002 | Rey-Fabret et al. |
| 2003/0213591 | A1 | 11/2003 | Kuchuk et al. |
| 2006/0108120 | A1 | 5/2006 | Saucier |
| 2009/0067288 | A1 | 3/2009 | Godager |
| 2009/0308601 | A1 | 12/2009 | Poe, Jr. et al. |
| 2009/0314371 | A1* | 12/2009 | Stensen ............... F16K 31/002 138/46 |
| 2010/0023269 | A1* | 1/2010 | Yusti ..................... E21B 43/00 702/12 |
| 2011/0119037 | A1 | 5/2011 | Rashid et al. |
| 2012/0146805 | A1 | 6/2012 | Vick, Jr. et al. |
| 2013/0116998 | A1* | 5/2013 | Shirzadi ............... E21B 43/20 703/10 |
| 2014/0262235 | A1 | 9/2014 | Rashid et al. |

OTHER PUBLICATIONS

UKIPO Search Report dated Jan. 30, 2012 (GB1119847.0).
NIPO Search Report and Office Action dated May 15, 2012 (NO20111580).
Rochon J et al: "Method and Application of Cyclic Well Testing With Production Logging", SPE Annual Technical Conference and Exhibition, Sep. 21-24, 2008, Denver, Colorado, USA, Society of Petroleum Enginners, No. SPE 115820, Sep. 21, 2008 (Sep. 21, 2008), pp. 1-15, XP002630733, DOI: 10.2118/115820-MS, the whole document.
Peter A Fokker et al: "Application of harmonic pulse testing to water oil di splacement", Journal of Petroleum Science and Engineering, Elsevier, Amsterdam, NL, vol. 79, No. 3, Sep. 12, 2011 (Sep. 12, 2011), pp. 125-134, XP028113488, ISSN: 0920-4105, DOI: 10.1016/J. Petrol.Sep. 4, 2011 [retrieved on Sep. 17, 2011] abstract, figures 6,7 1. Introduction, 2. Theoretical Background, 3. Analytical formulation, 5. Conclusions.
C.H. Kuo: "Determination of Reservoir Properties from Sinusoidal and Multi rate Flow Tests in One or More Wells", Society of Petroleum Engineers Journal, vol. 12, No. 6, Dec. 1, 1972 (Dec. 1, 1972), XPO55068508, ISSN: 0197-7520, DOI: 10.2118/3632-PA abstract Discussion.
D.A. Bradley et al: "Improving Prudhoe Bay Pulse-Test Data by Processing With Fourier Transforms", Proceedings of SPE Annual Technical Conference and Exhibition, Jan. 1, 1988 (Jan. 1, 1988), XP055068509, DOI: 10.2118/18124-MS ISBN: 978-1-55-563578-7 abstract Discussion Application.
Sanghui Ahn et al: "Estimating Permeability Distributions From Pressure Pulse Testing", Proceedings of SPE Annual Technical Conference and Exhibition, Jan. 1, 2010 (Jan. 1, 2010), XP055068516, DOI: 10.2118/134391-MS ISBN: 978-1-55-563300-4 Summary Methodology Multiple frequency information.
Florian Hollaender Imperial College London et al: "Harmonic Testing for Continuous Well and Reservoir Monitoring", SPE Annual Technical Conference and Exhibition, Sep. 29-Oct. 2, 2002, San Antonio, Texas, Society of Petroleum Engineers Inc, No. SPE 77692, Sep. 29, 2002 (Sep. 29, 2002), pp. 1-12, XP002630729, DOI: 10.2118/77692-MS Introduction.
Peter A Fokker et al: "Estimating reservoir heterogeneities from pulse testing", Journal of Petroleum Science and Engineering, Elsevier, Amsterdam, NL, vol. 86, Mar. 15, 2012 (Mar. 15, 2012), pp. 15-26, XP028518612, ISSN: 0920-4105, DOI: 10.1016/J.Petrol. Mar. 17, 2012 [retrieved on Mar. 27, 2012] abstract, 1. Introduction, 2. Numerical solution in the Fourier space.
International Search Report and Written Opinion dated Feb. 3, 2015 (PCT/EP2014/057881); ISA/EP.
UKIPO Search Report dated Oct. 29, 2013 (GB1306967.9).

\* cited by examiner

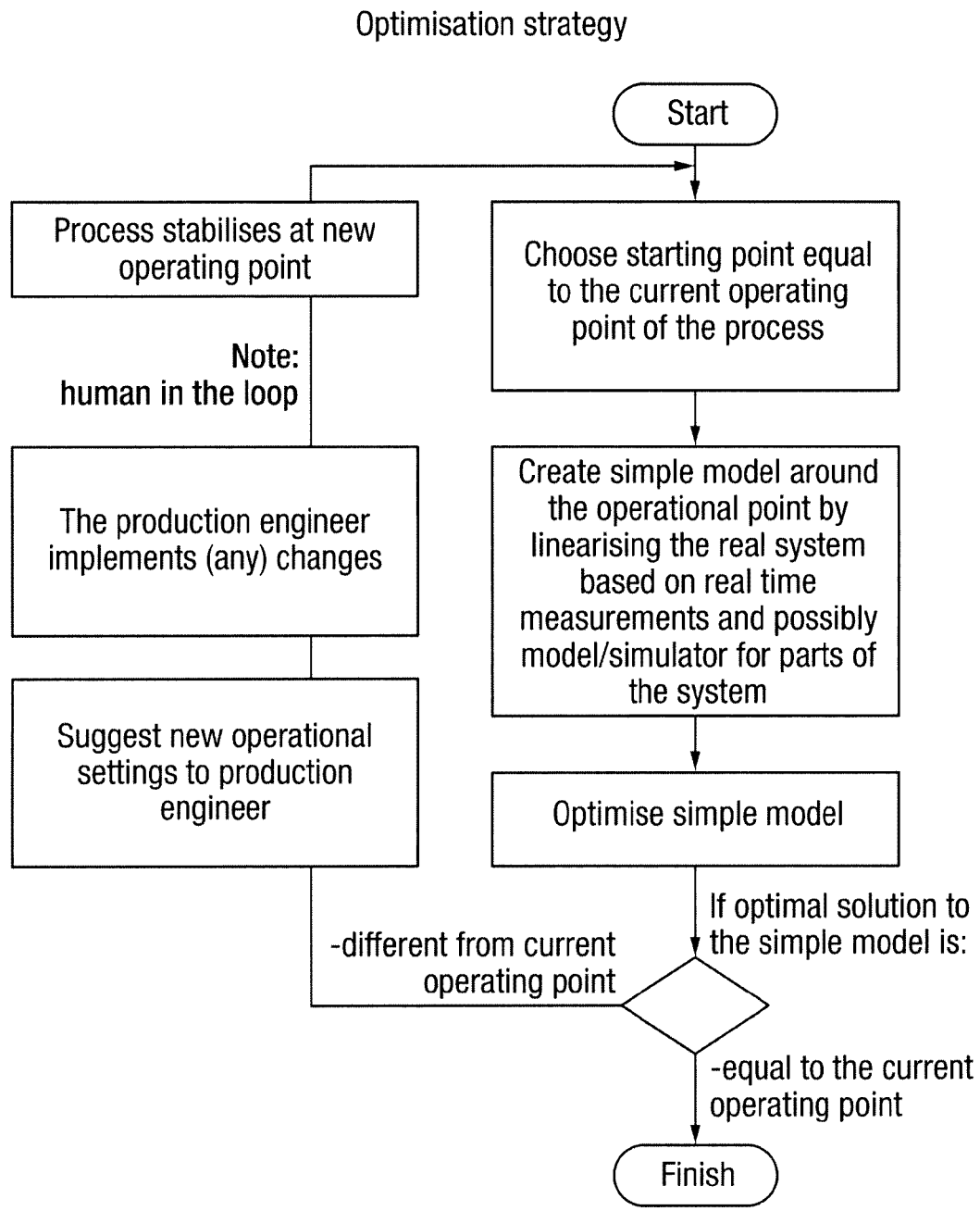

Fig. 3
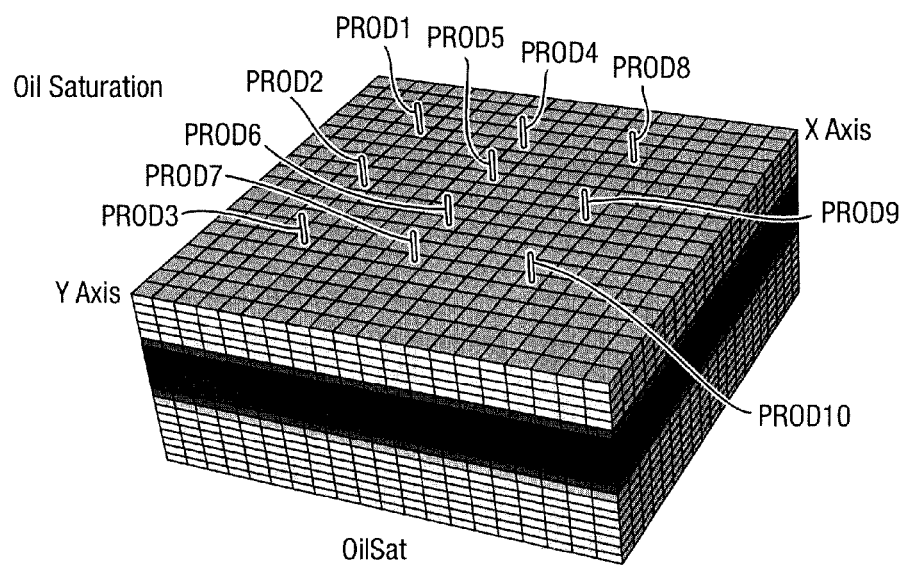
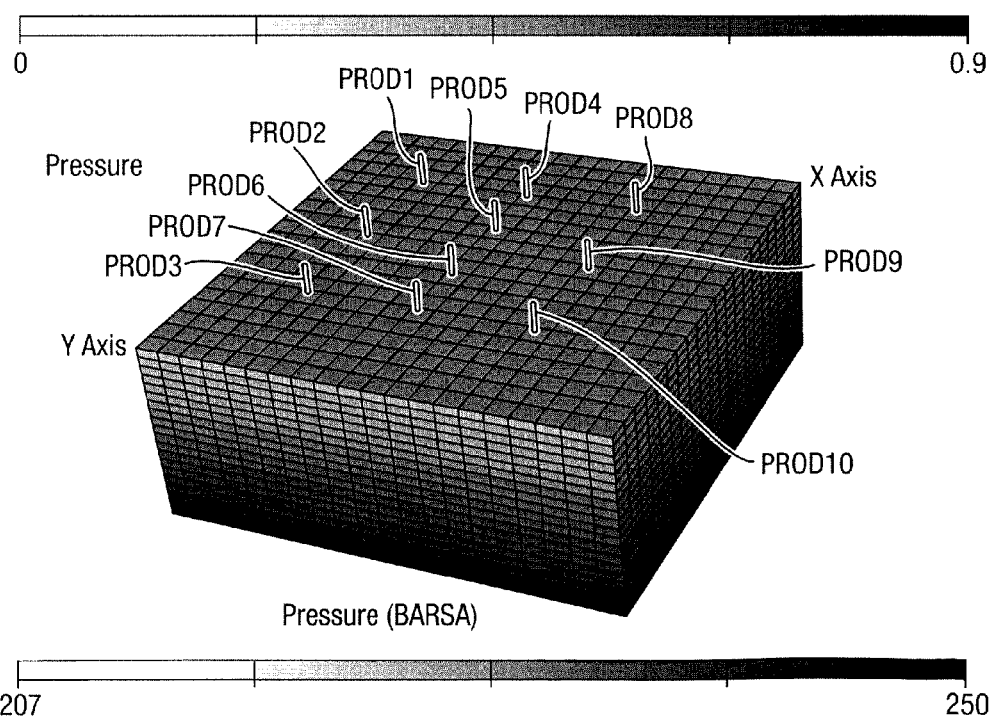

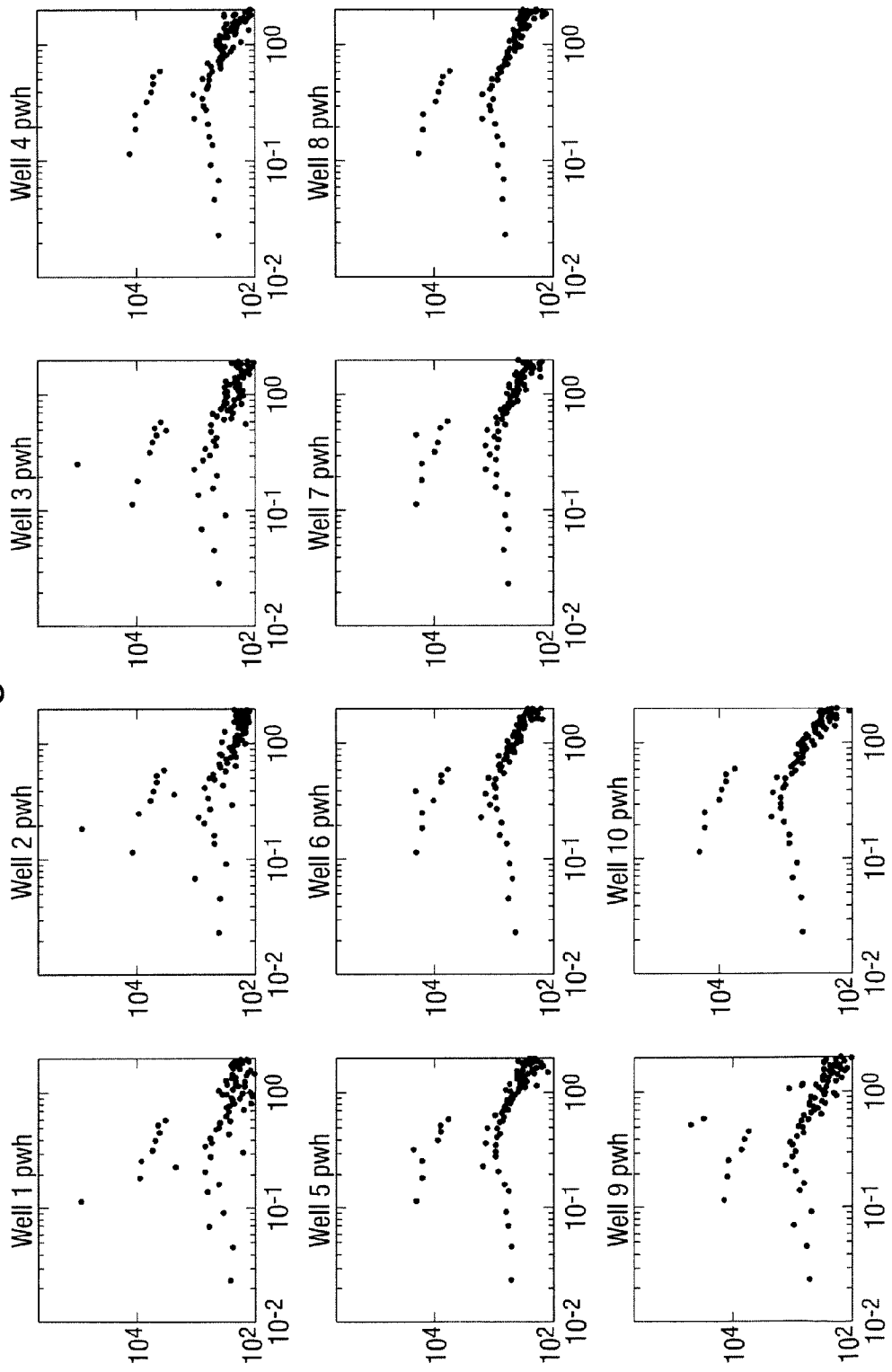

CONTROL OF FLOW NETWORKS

The present application is a U.S. National Phase filing of International Application No. PCT/EP2014/057881, filed on Apr. 17, 2014, designating the United States of America and claiming priority to British Patent Application No. 1306967.9, filed Apr. 17, 2013, and this application claims priority to and the benefit of the above-identified applications, which are all incorporated by reference herein in their entireties.

The present invention relates to an apparatus and a method for control of a flow network in order to improve the performance of the flow network, for example for optimising the production of oil and gas wells.

There are many industries where flow networks are used, for example in the processing and manufacturing of fluid and liquid products in factories and refineries. The oil and gas industry is an example of particular interest since the flow network includes oil and gas wells resulting in inputs to the flow network that can be difficult to model and in many cases may vary unpredictably. Further, the availability of critical process components changes with time and thereby capacities vary equivalently. It is thus difficult to optimise production settings for such networks. Simulations and models can be used in an attempt to predict the response of flow networks to changes in process parameters such as flows, pressures, mixing of different constituents and so on. However these models and accompanying optimisation problems can become very cumbersome and require significant computing power, whilst still providing nothing more than a computer assisted guess for optimum settings for the flow network.

Viewed from a first aspect, the invention provides a method for control of a flow network in order to improve the performance of the flow network, the method comprising:

(a) applying predetermined excitations at multiple control points within the flow network, wherein the multiple control points are at different branches of the flow network;

(b) receiving measurements of changes in one or more flow parameter(s) in one or more flow path(s) in which flows of more than one of the different branches have been combined;

(c) carrying out an analysis of the flow parameter measurements to identify variations induced by the applied excitations;

(d) determining an adjustment to be made at one or more of the control point(s) in order to improve the performance of the flow network;

(e) making the determined adjustment to the control point(s) of the flow network or making an alternative adjustment decided upon by the flow network operator; and (f) repeating steps (a) to (e) one or more times to thereby iteratively improve the performance of the flow network.

This method provides a significant advantage compared to prior art methods for controlling flow networks since it becomes possible to make an iterative improvement of the performance of the flow network where each iterative adjustment is made, and the impact on the real world system measured, before the next adjustment is decided upon. Advantageously, the proposed adjustment can be determined based on data that includes data obtained from real-time measurement of the system, which is effectively a real-time online experiment using the applied oscillations.

Preferably the analysis at step (c) includes creating a model, which can be a simple model such as a localised linear model, and this is then optimised in the determination step (d) to identify the best adjustment to the control point(s).

There are clear advantages to creating a model based on online experiments, i.e. by applying excitations to the actual flow network and receiving real-world results. This allows the iterative process to take account of the actual operating point of the flow network and to be based on the actual reaction of the flow network to the excitations.

Step (c) may include creating a local mathematical optimisation problem to calculate an adjustment of one or more of the control point(s) and in this case step (d) may include solving this optimisation problem in order to determine the required adjustment.

With a well characterised flow network, or parts of a flow network that are well characterised, it can also be possible to create simplified models, such as localised linear models, by exciting a simulator. This will allow useful data to be obtained and a proposed adjustment determined without the need for online experiments. Such simulation based excitations can provide a significant advantage in terms of speed and ease of testing, provided that it is appropriate to use a simulation. Thus, the analysis at step (c) may include the creation of models from simulator data in conjunction with models created from the real-world data. In this case step (a) includes applying excitations to the simulation and step (b) includes receiving simulated response to the excitations. Compared to conventional simulation this technique offers significant advantages since the optimisation of the model is far quicker than optimisation of the simulator. Moreover, there is a significant advantage in including input from the operator in the iteration at steps (d) and (e), with the model then being preferably updated to take account of changes in the flow network caused by the adjustment to the control points.

The excitations at step (a) always include online experiments with control points of the flow network as well as optionally data from simulations where such data is considered to be sufficiently accurate. When models based on simulations are used these models are preferably updated when steps (a) to (e) are subsequently repeated to take account of the adjustment made at the prior step (e).

In prior art simulations and models attempts are made to predict the performance of a flow network and to obtain a single solution "off-line" for an optimum configuration of the control points. A typical set-up for such a simulation is to use an iterative solution that starts from a known point, based on measurement of parameters of the flow network obtained using a conventional method, and then attempts to converge toward optimised performance without further input regarding the real-world impact of the iterative adjustment on the flow network. Clearly this is not ideal since there is an inherent risk of diverging from the actual way that the real-world system, which can include unpredictable and non-linear elements, will react to small adjustments of the control points.

The use of models, for example simple models like linear models, in conjunction with an iterative approach allowing for human input at step (e) allows for considerable improvements compared to known simulations, especially since excitations are also applied to the flow network to obtain real-world data on the reactions of the flow network. In place of a complex and lengthy simulation aimed at obtaining the best 'optimised' solution it is possible to proceed step-wise toward an improved solution and at each stage to see the actual changes resulting from the adjustments to the flow network. The model is far quicker than a full simulation.

Different experimental patterns may be used for the excitations, such as stepwise changes, linear patterns and sinusoidal variations. Models may then be extracted from the results of these experiments, using the measurements and analysis at steps (b) and (c), and these models may be used to perform step (d). Different experimental patterns have different pros and cons. Stepwise changes are for instance easier to implement than sinusoidal patterns, while sinusoidal patterns can be easier and more precise to analyse than step changes.

In a preferred embodiment the excitations are oscillations applied at known frequencies. Preferably the oscillations applied at different control points of the multiple control points are at different test frequencies and in step (c) a frequency analysis of the measured flow parameters is carried out. The oscillations may hence be applied in parallel with the frequency analysis allowing identification of the responses resulting from excitation of the different control points. This allows a model of the flow network to be obtained for use in determining the adjustment to be made at step (d). It is particularly preferred for the techniques applied to be similar to those discussed in WO 2013/072490 by Sinvent AS and Norwegian University of Science and Technology (NTNU), which proposes the use of oscillations for monitoring of oil and gas wells. Compared to this prior art the current disclosure adds the non-obvious feature of iterative improvement of the performance of the flow network.

With this frequency based method the properties of individual branches of the flow network can be easily determined without the need to carry out individual tests for each branch and without the need to stop the flow to allow individual branches to be tested. No dedicated test equipment aside from a measurement apparatus for the combined flow(s) is required since existing control points can be used to apply the required excitations. In addition, the use of the flow network for its normal purpose can continue with minimal interference. For example, when the method is used for an oil and gas production flow network then production can continue via the production header throughout the course of the test, and although the applied excitations will likely reduce the average flow rate the reduction in production is low compared to the reduction in production for a conventional test, such as a build-up test. For a field with ten wells, production during a test campaign can be over 4% higher for the method of the invention as compared to an equivalent build-up test. The different branches of the flow network (for example different wells) are tested in parallel with measurements of each individual branch being determined by looking at the effects of the oscillation frequency applied via the control point for that branch. By means of the frequency analysis, these effects can be isolated from other variations in the output flow.

An alternative method, which may be used instead of or in addition to the frequency based technique described above, is to use excitations applied sequentially rather than in parallel and to isolate the effects of the excitations by means of band pass filters or the like. An example is excitations applied by using repetitive step changes that approximate a sinusoidal waveform quite crudely. The measurements in step (b) may be filtered by a band-pass filter in step (c), i.e. a device that passes frequencies within a certain range and attenuates frequencies outside that range. This enables calculation of the sensitivity between the properties at different branches in the flow network to a control point. An example is the sensitivity between changes in a gas-lift rate at one well and the pressure drop in a pipeline.

For any of the methods discussed above, the control points may be any means capable of applying a controlled adjustment to the fluid with a known frequency of the adjustment. The adjustment may be in any suitable parameter of the fluid, such as a flow and/or pressure of the fluid. For example, suitable control points may include flow control valves, pumps, compressors, gas lift injectors, expansion devices and so on. The basic principle of the above methods can be applied with any device that can apply an excitation within conduits of the flow network (or in a simulation), since no matter what is used to apply the excitation is it is still possible to obtain information on the contribution of different branches of the network to combined flow via frequency analysis carried out downstream. The excitations need not only be in flow rate or pressure but may include other parameters, such as the level in a subsea separator and ESP pump setting. The measurement for step (b) should of course be selected with regard to the excitation that is applied to ensure that what is being measured will be affected by the applied excitation. For example a pressure excitation will affect flow rate and pressure but may also create output variations in temperature, water cut and so on.

In preferred embodiments where the method is applied to an oil and gas production flow network the control points may include one or more of the following: choke control valve; gas lift valve settings or rates on wells or riser pipelines; ESP (Electric submersible pump) settings, effect, speed, pressure lift, etc.; down hole branch valve settings, topside and subsea control settings on one or more: separators, compressors, pumps, scrubbers, condensers/coolers, heaters, stripper columns, mixers, splitters, chillers, etc. (any equipment that effects production).

The flow parameter(s) measured may be any parameter that is affected by the excitation applied at the control points. Hence, the flow parameter(s) may include one or more of pressure, flow rate (by volume or flow speed), level or temperature, all of which are parameters that may vary for an entire volume of a combined flow in response to variations in individual branches of the flow network. The flow parameter(s) could alternatively or additionally include one or more parameter(s) relating to the characteristics of the fluid in the flow network, such as a ratio of gas to liquid, proportions of certain components within the flow, density, pH and so on. In the example where the flow network is an oil and gas production flow network then the flow parameter(s) may for example include water cut (WC), productivity index (PI), Gas Oil Ratio (GOR), BHP and wellhead pressures, rates after topside separation, other rate measurements, e.g. water after subsea separation, other pressures, e.g. manifold line pressure, separator pressure, other line pressures, temperatures (many places along the production system), flow velocities or sand production, amongst other things The flow parameters may be measured directly, for example by means of a pressure or temperature sensor, or alternatively they may be measured indirectly, for example by calculations based on directly measured parameters.

The control points may include gas lift rates. It is preferred to use both excitations in gas lift rates and also excitations applied with choke valves.

Preferably excitation is applied to more than one type of control point and in the most preferred case it is applied to a majority or all of the available control points in the flow network or in a part of the flow network that is of interest. This allows an assessment to be made of the reaction of the flow network to perturbations in any of the available control mechanisms and hence allows the best possible adjustment to be identified by analysis of the variations to determine what control point adjustment will produce the more desirable change.

For similar reasons, it is preferable to measure a plurality of flow parameters at step (b) and in particular to measure the response for a majority of or all of the flow parameters that are relevant to the required improvement in the performance of the flow network. This may for example be flow parameters relevant to increased production for an oil and gas production flow network.

The improvement to the performance of the flow network may be embodied by any advantageous change in any part of the performance of the flow network. In one example the improvement includes increasing or decreasing one or more output parameters of interest and the output parameter(s) are hence the focus of the iterative changes in step (e) and repetitions of the process. The output parameters may concern production volume or quality, for example. The improvement may alternatively include changing another aspect of the flow network.

Thus, the improvement may involve one or more of: increasing or decreasing the one or more output parameter(s) of interest, increasing the accuracy of information provided by the analysis at step (c), adjusting operational parameters of components of the flow network in order to increase the service life of those components or other components of the flow network, or improving another aspect of the flow network not listed above.

The output parameter(s) of interest, which the method seeks to change in some examples in order to improve performance, may be any parameter(s) of the flow network. Such a parameter may be a parameter of the type that is measured at step (b), for example a total combined flow rate or a required pressure for a given production and so on. In the example where the flow network is an oil and gas production flow network then the output parameter(s) of interest may for example be pressure drop across the production choke, or total production. There may be just one output parameter of interest or instead the improvement to the system may relate to a combination of output parameters. If an output parameter of interest is not measured, e.g. flow velocity, other output parameter(s) may be used, e.g. pressure and temperature, to compute the parameter of interest, if an analytical expression is known, through first order physics or through an empirical correlation.

As an alternative or in addition adjustments may be made in order to increase the accuracy of the information provided at step (c) for example so that better local mathematical optimization problems can be defined. When the information is improved then better production recommendations can be computed in subsequent iterations and hence this may provide a way of improving the iteration process for improvements to the flow network by changing output parameters.

In a further alternative, which may also be carried out in addition (or in parallel) with the above improvements, the improvement to the flow network may comprise adjusting operational parameters of components of the flow network in order to increase the service life of those components or other components of the flow network, preferably without compromising other aspects of the performance of the flow network. Hence, for example one constraint applied may be that overall production should remain at or above a given level, whilst another constraint may be that there is a maximum flow rate for given parts of the flow network to avoid over-working certain components and hence extend their service life.

At step (d) and (e) the nature of the adjustment to the control points will vary with differing types of control points. For example, when the control point is a valve or similar then the adjustment will be an opening or closing movement of the valve. Often a control point will be automatically adjustable in a stepwise fashion. In that case the adjustment may comprise one or more steps.

The analysis at step (c) preferably comprises computation of the relationship between the excitations applied as an input at the control points in step (a) and the effect on the flow parameter(s) measured as an output in step (b). In preferred embodiments the analysis may include a step of finding a ratio of the input amplitude of the excitations to the output amplitude of the resultant variation in the flow parameter(s). As noted above it is preferred for the analysis to include creation of a model.

This analysis may utilise any analysis method capable of linking the input excitations with the output variations. One preferred example of this is a frequency analysis using multiple frequencies applied in parallel, as described in more detail elsewhere in this document. This allows for a quick and effective online experiment. Minimising the time taken to carry out steps (a) and (b) provides significant advantages. Alternatively, the analysis may link the output variations to the input excitations based on the timing or sequence of the input variations and a corresponding timing or sequence of the measured output variations, for example as described above in relation to sequentially applied excitations and the use of band pass filters. Once the relationships between the excitations and the flow parameter(s) are known then it is trivial to create a linear model, for example by dividing the amplitude of the excitations with the amplitude of the corresponding flow in order to obtain a linear mapping between all inputs and all outputs of the system. The determination of an adjustment at step (d) may involve a simple comparison of the relationships in step (c) above to identify the adjustment that will generate the greatest improvement in the output parameter(s) of interest. The improvement may be a positive or negative change in the output parameter depending on the nature of the optimisation. In the example of improving total production for an oil and gas production flow network the required improvement would be an increase in an output parameter that related to total production.

In preferred embodiments step (c) includes the creation of a local optimisation model, for example by combining the linear input-output model. Step (d) may include optimisation of the model to determine the required adjustment. When a suitable model is created then the user may set an objective/goal (for example a flow parameter of interest to maximise or minimise), system boundary constraints, and operational constraints, one is able to build a local optimisation model that can suggest changes to improve production.

The method may include a step of advising users of the results of the analysis via a control or support system. The control points may be automatically adjusted by a control system to improve performance based on the determined adjustment. Alternatively the determined adjustment may be presented to the operator of the flow network as a proposed adjustment in order to permit the operator to have the choice of following the proposal or applying an alternative adjustment based on the operator's judgement. With either alternative there are significant benefits arising from the control method since further analysis of the performance of the flow network in the repeated steps (a) to (c) is based on actual measured values. This leads to a better knowledge of the system and ensures that the performance of the flow network can be iteratively improved by adjusting the control points toward an optimal configuration. For example, well production rates may be controlled to optimise production for the oilfield or for a group of wells.

In embodiments where oscillations are used for the excitations, the step of applying excitations may include sending control signals to equipment at the control points and/or may include the step of controlling flows and/or pressures at the control points. The excitations may be applied via existing control devices, such as existing valves or pumps and so on. Using existing valves in this way means that the method can require no modifications to existing equipment to apply the excitations to the flow network, aside from changes to a control system of the flow network to implement the required control of the valve opening/closing.

The oscillations are preferably approximately sinusoidal, for example waveforms applied via stepwise changes in the valve position in order to approximate a sine wave. The use of a sine wave, or an approximation thereof, provides accurate results when the output data is analysed using conventional frequency analysis techniques, such as techniques based on the Fourier transform.

In one particularly preferred embodiment the method is applied to an oil and gas production flow network. In this instance the control points may be control points for controlling flows and/or pressures of wells within the oil and gas production flow network, for example control points at the well heads and at a riser base. Preferably choke valves and/or gas-lift rates (both at well heads and at a riser base) are used to apply the excitations to the flow rate from the wells. Choke valves can be easily controlled to open and close gradually in order to apply a waveform of the selected frequency to the flow rate. Gas-lift rates can also be easily controlled to increase or decrease the rate gradually in order to apply a waveform of the selected frequency to the flow rate. It is preferred to use excitations applied with both choke valves and gas lift rates.

Preferably, the method includes selecting the frequencies for the excitations based on characteristics of a typical frequency spectrum for the flow network. This allows the frequencies to take account of the underlying frequency spectrum that occurs in typical variations in pressure, flow rate and/or temperature occurring during normal operation of the flow network, and thus can enable the frequencies to be selected to avoid frequencies where factors such as damping or noise might interfere with the results of the analysis. The frequency spectrum for the flow network may be a measurement of combined flow rates or pressures over a period of time, for example over several days.

The method may hence include selecting frequencies for the oscillations by carrying out frequency analysis of the production waveform and identifying a suitable frequency range, preferably a frequency range with low damping and low noise. In the example of oil and gas production flow networks it has been found that production waveforms typically exhibit damping and hence reducing amplitudes at higher frequencies, and that at lower frequencies there is noise arising from operational processes. Thus, preferably the frequency range is selected by removing higher frequencies that exhibit damping and/or by removing lower frequencies that are obscured by noise.

The frequency analysis used in identifying suitable oscillation frequencies is preferably based on a Fourier transform. The use of a fast Fourier transform (FFT) algorithm is preferred, since this provides considerable advantages in relation to the speed of the analysis.

When a suitable frequency range has been selected it is necessary to determine the test frequencies to be used for the oscillations at the wells. The step of determining the test frequencies preferably includes determining frequency slots within the frequency range that will not interfere with one another. The step of determining frequency slots preferably includes determining a spacing for the frequency slots based on the number of frequencies required and/or on the total test period available.

The selected frequencies should avoid interference with each other and with significant harmonics. Thus, they should be spaced apart and they should avoid the main harmonic (2nd harmonic) of other test frequencies. The main harmonic will be double the test frequency. Thus, for example, if a first test frequency is set as 0.1 mHz then this means that 0.2 mHz should not be another test frequency.

In a Fourier analysis the total test period required to provide resolution for a given frequency spacing is the inverse of the frequency spacing. Thus, for example, a spacing of 0.5 mHz requires a minimum total sampling time of about 30 minutes, and a spacing of 50 µHz requires a minimum total sampling time of about 6 hours. Reducing the frequency spacing too much can hence result in an excessively long test time. The frequency spacing may be selected to ensure that the total test time is limited to be 60 hours or less (i.e. a spacing of 5 µHz or above), preferably 12 hours or less (i.e. a spacing of 25 µHz or above), more preferably 6 hours or less (i.e. a spacing of 50 µHz or above).

The number of frequencies required will relate to the number of control points that need to be excited. In the simplest case, the method may include selecting a number of frequency slots that will provide available test frequencies for the total number of control points to be excited. However, for large numbers of control points it is not necessarily desirable to simply divide the available frequency range into sufficient frequency slots to provide available frequencies for all the control points. To allow the testing of large flow networks having many branches without the need to use an undesirably small frequency spacing the method may include grouping the control points and exciting oscillations at batches of control points. The groups of control points may each include 2-25 control points, preferably 5-20 control points.

The amplitude of the oscillations should be set to ensure that the frequency analysis provides results that can be distinguished from the baseline amplitude of variations of the frequency spectrum for the flow network, for example the amplitude may be set to be an order of magnitude higher than the amplitude for the selected frequency range in a normal frequency spectrum for the flow network. The amplitude of the input oscillations may be in the range of 10-10000 $Sm^3/h$, preferably 50-1000 $Sm^3/h$. Production constraints or other constraints on the flow network may set a maximum for the amplitude, since an increase in amplitude can give rise to a decrease in production. The method may include determining a baseline amplitude for the selected frequency range by determining a line of best fit for the frequency/amplitude data, for example by a least squares analysis. The amplitude for the input oscillations may then be set to be at least five times larger than the baseline, preferably ten times larger. All the oscillations may be applied at the same amplitude, which could for example be a factor larger than the average baseline amplitude for all frequencies. This simplifies control of the mechanisms of the control points used to apply the oscillations. In one preferred embodiment the amplitudes for each test frequency are scaled to match the baseline amplitudes at the test frequencies. This can enhance accuracy whilst avoiding unnecessary loss in production. It allows the accuracy to be set to a desired minimum based on the baseline amplitudes, without introducing unnecessarily large amplitudes.

The measured flow parameters, such as pressure, flow rate and or temperature, for the example of an oil and gas production flow network, may include one or more of wellbore pressure, wellbore temperature, wellhead pressure, wellhead temperature, oil flow rate, gas flow rate, and/or water flow rate. The method may include measuring of this data, for example by means of sensors placed to sense the flow in the relevant flow passages. Flow measurements for flow rate of the total flow or separated flow(s) may be taken at any point downstream of the production header. Preferably, the flow measurements are taken at a point downstream of a separator that receives the flow from the production header. After the separator more measurements are possible since they can be measurements of the separated flows.

The step of carrying out a frequency analysis to determine pressure, flow rate and/or temperature variations induced by the applied oscillations may include the use of a Fourier transform as set out above, preferably a fast Fourier transform (FFT) algorithm. This produces an output frequency/amplitude plot in which the effects of the oscillation frequencies can be seen. The method preferably comprises determining properties of the different branches of the flow network by determining output pressure and/or flow rate amplitude values at the test frequencies and using these amplitudes to determine the basic properties of the individual branches, or groups of branches. The baseline amplitude for the measured output pressure/flow rate may be determined by removing data points relating to the test frequencies and their second harmonics, and then determining a line of best fit for the remaining results, for example by means of a least squares analysis as above, and this baseline amplitude may be used to provide an indication of the accuracy of the results.

Further properties of the flow network may then be calculated based on the flow and/or pressure data. For example, in the case of an oil and gas production flow network using data relating to oil flow rate and water flow rate error propagation theory can be used to determine water cut (WC) and productivity index (PI). Given $A_o$ and $A_w$ as amplitudes for oil and water flow rates respectively then $WC=A_w/(A_o+A_w)$. Similarly, $PI=A_o/A_p$, where $A_p$ is the amplitude of downhole pressure. Also, $GOR=A_g/A_o$ where $A_g$ is the amplitude of gas flow, and IPR can be calculated by PI measured at two operating points, or using the second harmonic if the input is large enough. Any of these parameters, or any other parameter of a different flow network, may be selected as the parameter that is improved by the adjustment of the control point(s).

The step of applying oscillations may include applying the different frequencies at different phases. If the oscillations are all applied in phase then this creates a large peak in the cumulative effect on the total flow rate of the combined branches. This is not a problem in all flow networks, for example in an oil and gas production flow network when the production is well-limited, since the effect of the oscillations on the production output will be the same whatever the phase relationship. However, it can have an adverse effect in some scenarios, for example in an oil and gas production flow network when the production is process-limited. Thus, in a preferred embodiment the phases of the applied oscillations are shifted to reduce variations in the combined output flow of the flow network.

The method may include a step of measuring the level of the second harmonic for the applied test frequencies. This can be used as a test to check for non-linearity in the system and thus of the validity of the local mathematical optimisation problem, since if the second harmonic is low then this is a good indicator of an absence of higher harmonics. In addition, the amplitude of the second harmonic can be used in conjunction with the amplitude of the test frequency to determine the parameters of higher-order polynomial models for the flow network.

Viewed from a further aspect, the present invention provides a control apparatus for controlling a flow network to improve the performance thereof, the apparatus comprising:

a controller for applying excitations at multiple control points within the flow network, wherein the multiple control points are at different branches of the flow network; and a data analysis device for receiving measurements of changes in one or more flow parameter(s) in one or more flow path(s) in which flows of more than one of the different branches have been combined, carrying out an analysis of the flow parameter measurements to identify variations induced by the applied excitations, and determining a proposed adjustment to be made at one or more of the control points in order to improve the performance of the flow network;

wherein the controller is arranged to make the proposed adjustment to the control points of the flow network or an alternative adjustment decided upon by the flow network operator; and wherein after an adjustment is made the controller is arranged to repeat the excitation of the control points and the data analysis device is arranged to thereafter repeat the measuring, analysis and determining steps to thereby enable an iterative improvement to the performance of the flow network.

The controller may control the control points to apply the excitations by sending control signals to the control points. In some preferred embodiments, the apparatus includes the control points, which may be at points distributed throughout the flow network. Alternatively, the control points may be a part of a different apparatus, whilst being directly or indirectly controllable by the controller.

The control points, flow parameter(s) and output parameter(s) may be as discussed above in relation to the first aspect of the invention. The applied excitations may be as discussed above in relation to the first aspect of the invention. The apparatus may optionally include the use of excitations applied in a simulation of the flow network and measurement of the response of the simulator. The use of a simulator can augment the real world measurements, as described above.

The controller and data analysis device may be separate or they may be combined into a single device, for example a computer device for control of the flow network and analysis of flow network data.

Viewed from a yet further aspect, the present invention provides a computer program product comprising instructions for execution on a data processing apparatus, the apparatus including hardware or software connections to permit excitations to be applied at multiple control points within a flow network and optionally in a simulator of all or a part of the flow network; wherein the instructions, when executed, will configure the data processing apparatus to carry out a method as described in the first aspect above.

The computer program product may configure the apparatus to carry out method steps as in any or all the preferred features set out above. The data processing apparatus may include features as discussed above for apparatus of the second aspect. The apparatus may include an interface for providing the proposed adjustment to the user and for/or receiving an input from the user for adjusting the control points.

It will be understood that in the discussion above the flow path(s) in which flows have been combined will typically be flow paths that are downstream of the control points, although in some situations, such as with pressure variations, upstream effects may occur, requiring upstream measurements.

Certain preferred embodiments of the invention will now be described by way of example only and with reference to the accompanying drawings, in which:

FIG. 1 is a flow chart showing a preferred embodiment of a method of controlling a flow network;

FIG. 3 shows oil saturation and pressure for the oilfield simulation;

FIGS. 14 and 15 show the results of a frequency analysis of the data in FIG. 13.

Figure 2A:
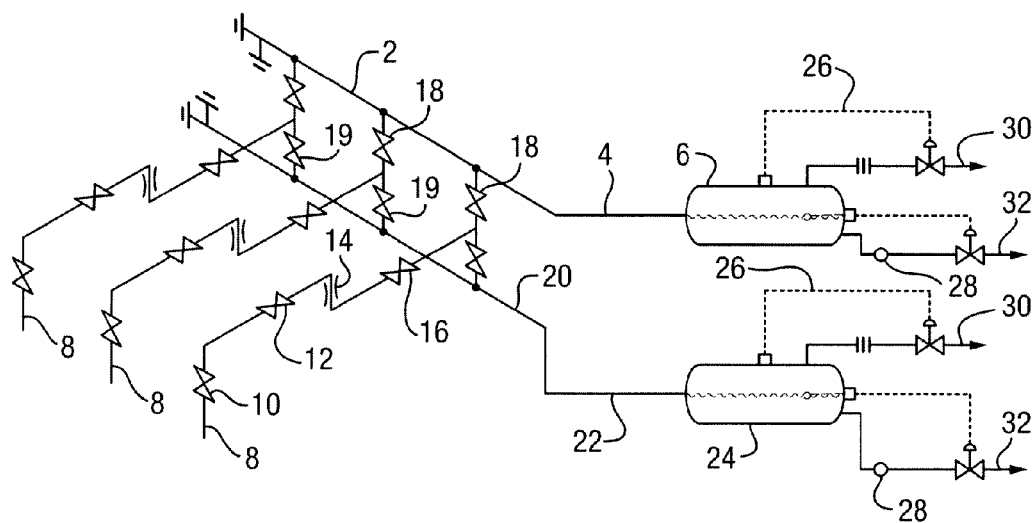
FIG. 2a is a schematic of a typical set-up for oil and gas wells.

The preferred embodiments described herein are for controlling a flow network to improve the performance of the flow network. This is done by analysis of the response of the flow network to input excitations and assessment of a small adjustment that will result in an improvement to the performance of the flow network, within given constraints. These adjustments can be made iteratively, each time taking account of analysis of the flow network and its behaviour after the prior adjustment has been implemented.

The basic principle, as shown in FIG. 1, is as follows:

1. Use the current operating point as the starting point for the search for a suitable adjustment. Excite the control variables at this operating point to build a model of the flow network and/or derive a model of the flow network from a simulation to obtain a model centred on the current operating point. The model may be a simple model such as a localised linear model.

2. Since the model of the well and production system is quite accurate close to this operating point, and poorer further away, a proposed new operating point should be in the vicinity of the current operating point.

3. Search for a new operating point within the domain where the current model is valid, with the aim to providing improved operation for the flow network. In the preferred embodiment this is done by optimising the model.

4. Proposing the new operating point to the flow network operator and adjusting the flow network to move it to the new operating point or optionally to a different operating point chosen by the operator.

5. Preferably after allowing time for the flow network to stabilise, the excitation/modelling is repeated to gather new information at this new operating point and then the method repeats the process of finding another new operating point to iteratively move toward an optimal solution.

To summarize, compared to known simulation techniques for optimisation the proposed method focuses on small stepwise improvements rather than a large step towards the optimal solution. The result is a more robust and acceptable 'online' production optimisation concept than a conventional optimisation approach.

This approach essentially solves a simple linear program, quadratic program or mildly non-linear program iteratively. However, in the preferred embodiment it does not create the model only by linearizing the simulator at the working point. Instead, it does so by linearizing the real system, i.e. by creating some or all of the model directly from the real system measurements. This is a second core difference between the preferred embodiments and a regular optimisation approach.

A consequence of this approach is that the operator becomes an active part of the search for an optimal solution since the user can intervene at each new operating point. The user can implement his/her preference based on intuition and experience, the recommendation from the proposed control method, or a combination of the two.

The preferred embodiment extends the use of techniques developed for the purpose of well testing in step 1 above, wherein oscillations are applied as the input excitation at control points within the flow network, for example at choke valves controlling the pressure and/or flow at well heads. It is useful to first understand the well testing method before considering the currently proposed method of optimisation of flow networks. It will however be understood that the current method is not limited to use with oscillations applied at wells or in flow networks forming all or a part of an oil and gas production system.

The well testing method is described in WO 2013/072490 by Sinvent AS and Norwegian University of Science and Technology (NTNU). Parts of the disclosure therein are thus repeated below to aid understanding of the currently proposed optimisation method. The well testing method of WO 2013/072490 provides a significant advance in that field since it permitted the properties of individual wells can be determined without the need to carry out individual tests for each well and without the need to shut in the wells. A dedicated test header is not required, and this can reduce the complexity and cost of the field equipment.

Production continues via the production header throughout the course of the test, and although the applied oscillations will likely reduce the average flow rate the reduction in production is low compared to the reduction in production for a conventional test, such as a build-up test. For a field with ten wells, production during a test campaign can be over 4% higher for the well testing method described herein as compared to an equivalent build-up test. The wells are tested in parallel with measurements of each individual well being determined by looking at the effects of the oscillation frequency applied for that well. By means of the frequency analysis, these effects can be isolated from other variations in the output flow. The testing occurs with production online and with normal flow patterns during the mixing of flow from the multiple wells. Thus, in contrast to conventional testing, because there is no shut-in of the well during testing then there is no need for subsequent reconciliation of measured results to take account of changes in the flow patterns arising from the test process. This removes a source of errors from the test procedure.

A typical setup for conventional well testing is shown in FIG. 2a. A production header 2 connects via a production flow line 4 to a production separator 6. In this case the production header 2 is connected to three wells 8. The wells 8 in this example all draw oil and gas from the same oil field. Each well 8 is connected to the header by a master valve 10, wing valve 12, choke 14 and check valve 16. Isolation valves 18 connect the production header to the lines from the wells 8. The lines from the wells are also connected via another set of isolation valves 19 to a test header 20. The test header 20 is a dedicated header used only for testing purposes. It connects via a test flow line 22 into a test separator 24. The production separator 6 and test separator 24 are tanks that separate oil and gas. Under the influence of gravity the oil settles at the base of the tank, with the gas occupying the space at the top of the tank. Each separator 6, 24 is equipped with a pressure control line 26 connecting the gas filled headspace of the separator 6, 24 to a valve on the gas outlet line 30. For each of the production separator and the test separator there is also a sampling and metering device 28 on the oil outlet line 32. After separation oil and gas are piped separately for further processing via the oil outlets 32 and gas outlets 30. The separators 6, 24 can also include a water outlet for extracting water from beneath the oil.

During conventional well testing one well 8 is tested at a time using prior art methods by controlling the flows in the production header 2 and the dedicated test header 20. The present well test system avoids the need to test only one well 8 at a time, and instead permits multiple wells 8 to be tested in parallel.

As described above, the newly developed well test system involves the use of oscillations applied to the wells 8 at set frequencies using the choke valves 14. A different frequency is used for each well 8, thereby enabling data to be obtained about multiple wells 8 simultaneously by the use of a subsequent frequency analysis. In the frequency analysis the different frequencies are used to earmark data relating to a particular well 8. There is no need to adjust the flows compared to normal production, and so this testing method gives data that directly relates to properties of the wells 8 during normal production.

With an equipment set-up of the type shown in FIG. 2a the input excitations are implemented by applying oscillations to the pressure and flow rate of the wells 8 via the choke valves 14. A typical choke valve 14 can be opened and closed in 200 steps over a period of about five minutes. The choke valves 14 can therefore be used with a suitably configured controller to apply oscillations in the flow rate over a wide range of possible frequencies.

During application of these oscillations with choke valves 14 the well test also includes measurement of pressures at the wellhead and well bore, measurement of flows for oil and gas out of the separator 6, and also measurements of water flow rate if the separator also allows for separation of water from the oil. The test can also include gathering data relating to the gas-oil ratio, water cut and so on. The measured data is analysed and effects arising from the outputs of the various wells are identified based on a frequency analysis of the type discussed below.

Figure 2B:
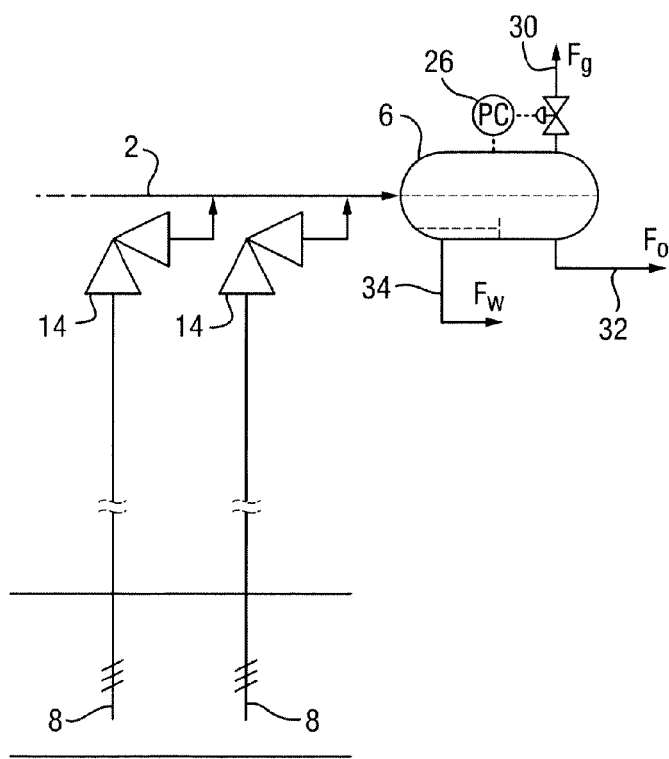
FIG. 2b shows an arrangement of field equipment in an oilfield simulation used to demonstrate a well testing method.

The frequencies that are used are determined based on the characteristics of the oil field and wells in a manner set out in more detail below with reference to FIG. 4, which is taken from WO 2013/072490. In accordance with various different examples of a well testing method, the oscillations can be applied for only a short period of time as described below with reference to FIGS. 5 and 6. The analysis in relation to those figures is derived from a simulation of an oil field using the Eclipse black oil simulation modelling package as supplied by Schlumberger Limited. The test model used an array of 20 blocks square by 20 blocks high with a grid spacing of 25 meters square by 10 meters high. The permeability was set at 300 mD and the porosity at 25%. In the model oil saturation was set at 0 in layers 1 through 7 and layers 15 through 20 and above zero in the central layers, peaking in layers 9 through 12. Pressure increases through the layers as is conventional. The simulation includes 10 vertical wells, perforated in layer 12. For the purposes of the Eclipse model the field equipment is as shown in FIG. 2. FIG. 3 shows the oil saturation and pressure for the model.

For the purposes of illustration FIG. 2 shows only two out of the ten wells 8. The wells 8 connect through choke valves 14 to a production header 2 that then feeds into a production separator 6 in a similar manner to the system described above in connection with FIG. 1. The production separator 6 has an oil output 32 with an oil flow rate $F_o$, a gas output 30 with a gas flow rate $F_g$, and also a water outlet 34 with a water flow rate $F_w$. As with the system of FIG. 1 there is a pressure control 26. As noted above, when operating in a real world system it is envisaged that oscillations in accordance with the currently proposed methods will be applied through the wells via the wellhead chokes 14. The choke valves 14 would be opened and close in order to induce oscillations in the flow rate and in the wellhead pressure. However, for the purposes of this model and due to constraints in the Eclipse modelling package the variations in wellhead pressures are applied in a simulation not by a choke valve 14, but instead in a simulated wellhead pressure variation created by the software. It will of course be understood that the end result is the same. The field equipment set up in FIG. 2 relates to platform wells without a subsea manifold, although the well test is not limited only to this setup. An alternative setup is discussed below in connection with FIG. 19.

In order to achieve the best results using the proposed iterative production optimisation method with embedded experiments it is important to select an appropriate set of frequencies that will enable multiple wells to be tested simultaneously, with the frequencies minimising interference with one another, and with it being possible to clearly identify oscillations induced in the outputs of the oil field, i.e. in measurements of the well bore pressure, oil flow rate and water flow rate during the text procedure. It will be understood that in the well bore pressures and output flow rates for an oil field there are on-going variations in production rate. FIG. 4 shows a production waveform based on real world data from an oil field with multiple wells as used in WO 2013/072490 by Sinvent AS and Norwegian University of Science and Technology (NTNU). The production flow fluctuates considerably about its mean flow rate and the production waveform also includes a degree of noise. In order to determine the frequency components of this signal a Fourier transform is applied. Several variations of Fourier transform can be used such as discrete Fourier transforms discrete time and discrete frequency transforms and so on. A fast Fourier transform (FFT) algorithm can also be used and this is preferred since FFT tends to be considerably faster and more efficient in terms of computing power. The input to the frequency analysis is a production waveform for total pressure or flow rate for an oilfield and the output is a complex data series whose absolute value can be depicted as shown in FIG. 4 as a series of points showing frequencies and amplitudes of those frequencies.

Figure 4:
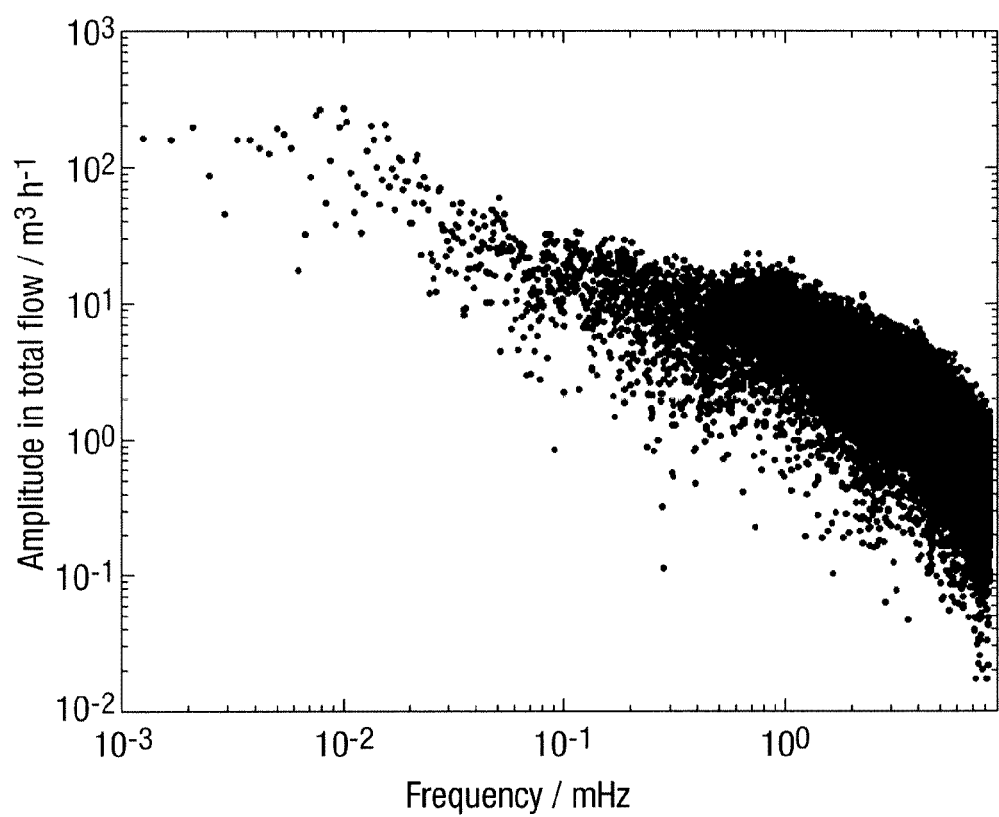
FIG. 4 illustrates the results of a frequency analysis of real-world production data from an oil field.

It will be seen from FIG. 4 that in the relatively large frequencies, i.e. frequencies in excess of 1 mHz and approaching 10 mHz and above, there are some damping effects, and so the increasingly high frequencies have a generally decreasing amplitude. Also, with low frequencies, below 0.1 mHz for this example, high amplitude events start to appear as a consequence of processes occurring during the oil production operation and these create excessive noise in the system. Similar phenomena will be seen in the production waveforms for other oil fields. The frequency window for oscillations to be applied to the wells should be selected to avoid these issues. Hence, in this case an appropriate frequency window to select for frequencies that should not suffer from damping and should be easily distinguishable from other frequency components of natural variations in the oil filled production flow would be a frequency window between 0.1 to 1 mHz, which roughly equates to periods of between 15 minutes and two and a half hours.

It is expected that frequencies in this type of range will be appropriate for many oil fields. However, an analysis of production data should be carried out for each oil field in order to find an appropriate set of frequencies that can be used in order to provide effective results from the well testing method. Another point to note is that although frequencies within the window of 0.1 to 1 mHz will generally be best for this particular oil field, it can also be useful to consider higher frequencies for some types of testing, such as composition tests, since for all composition testing the damping effects that arise at high frequencies will not be such a problem. When the optimisation method described below is used in other industries then different frequency ranges may be required, but they can be devised using a similar methodology.

Once the frequency range has been determined, it is also necessary to select appropriate frequencies within that range. The selected frequencies should avoid interference with each other and with significant harmonics. The relationship between the bottom pressure of the well and the wellhead pressure is nonlinear and therefore will be expected to produce a second harmonic and possibly further ones. Ideally the second harmonic should be checked to see that it is small. A low or negligible output at the second harmonic of the input frequency is an indicator that there are no higher harmonics and that there is no problem with non-linearity that could skew the results of the analysis. The test frequencies should hence be selected to avoid frequencies which will be affected by or will mask the second harmonics of other test frequencies. Hence, for example if one test frequency is set at 0.1 mHz, then 0.2 mHz should not be used as another frequency in a test. Similarly, if a frequency is set at 0.15 mHz, then 0.3 mHz should not be used as a frequency for another well in the test. In addition, the selected frequencies should have a spacing that is small enough to provide a sufficiently large total number of frequencies to cover all the wells, but large enough to avoid an excessively large sampling time. The total sampling time required is the inverse of the minimum spacing between the selected frequencies.

In the present example with a frequency window of 0.1 mHz to 1 mHz then in order to test the simulated oil field with ten wells we will naturally need ten frequencies. Since a number of frequencies will not be available for use, then in order to obtain ten test frequencies it is necessary to consider frequencies spaced close enough together to produce somewhat more than ten frequencies. This can be done by providing twenty frequency slots, allowing for up to half of the frequency slots to be removed by conflict between harmonics and so on. For this example, the range available for test frequencies is 0.1 mHz to 1 mHz, and so the potential frequency slots should be spaced apart from one another by 50 µHz to provide twenty possible frequencies. With a frequency spacing of 50 µHz, then the total time required to complete the test in order to provide a full set of results in the frequency analysis will be six hours. This compares very favourably to the minimum total time for an equivalent build-up test campaign, which might require five days.

With the frequency range of 0.1 mHz to 1 mHz and a spacing of 50 µHz it is relatively straightforward to determine a set of frequencies are available and do not cause conflict with the second harmonics of other frequencies. One possible set of frequencies is 0.1 mHz, 0.15 mHz, 0.25 mHz, 0.35 mHz, 0.4 mHz, 0.45 mHz, 0.55 mHz, 0.6 mHz, 0.65 mHz, 0.75 mHz and 1 mHz. In our example simulated oil field, which has ten wells, we can select ten out of these eleven frequencies to be applied to the ten wells. As noted above, the oscillations should be applied to the wells for a minimum time period of six hours.

Figure 5:
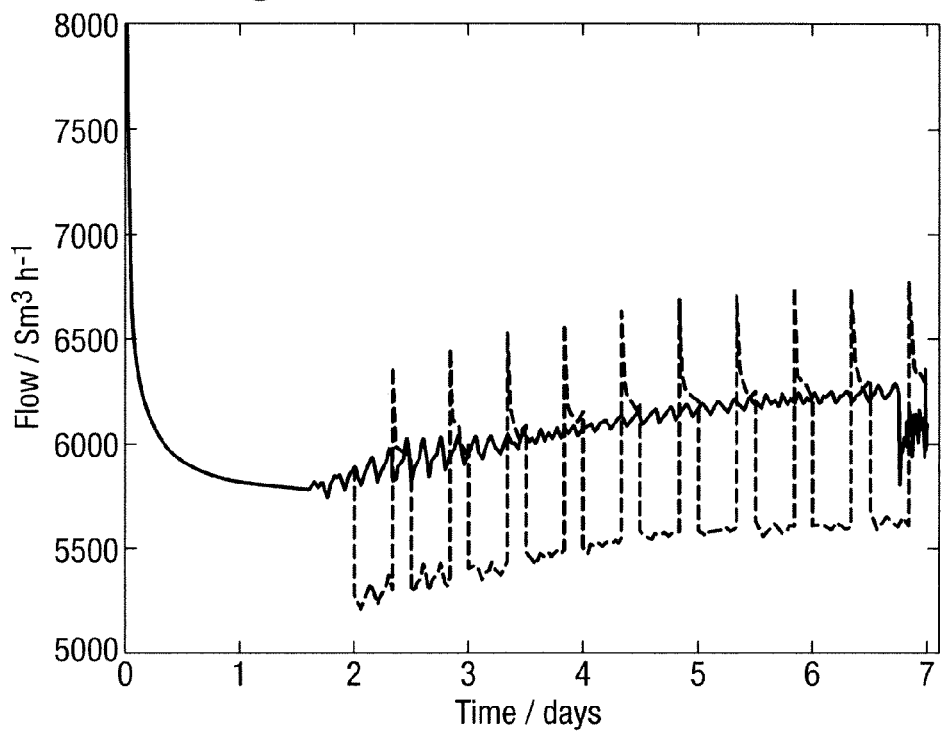
FIG. 5 is a graph derived from the oilfield simulation showing variations in production flow rate during a standard build-up test campaign and variations in production flow rate during a well test using oscillation input at the wells.

FIG. 5 shows the total output flow rate for the simulated oil field of FIG. 3 when it is tested in a conventional build up test and also when it is tested over a six hour period using the new method with oscillation frequencies selected from those listed above. The two different test regimes can easily be distinguished. In the build-up test there are ten clear cycles including a significant drop in overall flow as one well after the other is shut in and then started again. For the oscillation based testing method, a considerably shorter time period is required. As will be seen from the Figure the build-up test takes place over five days whereas the oscillation based test needs only six hours. The oscillations are applied during the final six hours of the graph. It will be understood that as a consequence of avoiding the need to shut down each well in turn production during the test campaign is greatly increased production continues uninterrupted with the only change being oscillations applying from normal changes in flow rate and wellhead pressure until the final six hours of the week long period. The consequence of this is that production using this six hour oscillation based well testing method is considerably higher in total over the text period. With the example shown total production is approximately 4.3% higher than production when the build-up test is carried out. In the example shown the flow rate for the oil field is of the order of 6000 m$^3$ per hour and this means that the added production over the test period shown can be about 42,000 m$^3$. This added oil production would have a value of several tens of millions of dollars at current rates, hence providing a significant benefit.

Figure 6:
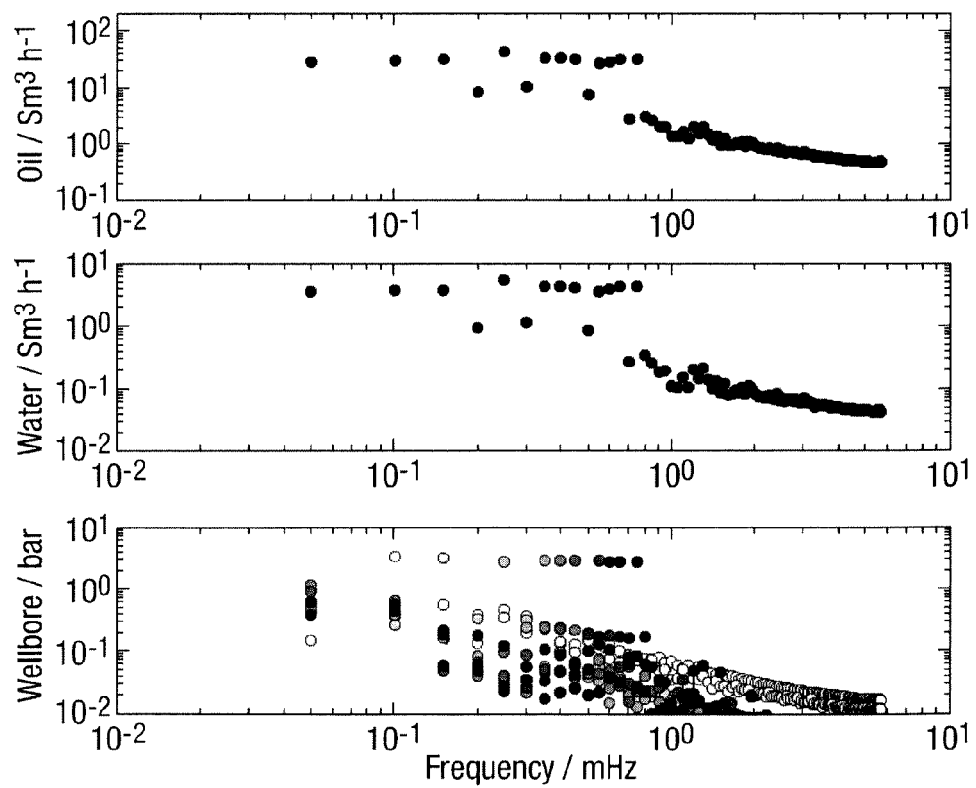
FIG. 6 shows the results of a frequency analysis of the well test in FIG. 5 including wellbore pressure, water flow rate and oil flow rate.

Whilst the test is carried out with the oscillations being applied at the resultant changes in well bore pressure, water flow rate and oil flow rate are measured and then subjected to a frequency analysis of the type described above. The results are shown in FIG. 6. As can be seen, there are clearly identifiable oscillations in the outputs of the test which correspond to the input oscillations at frequencies of 0.1 mHz, 0.15 mHz, 0.25 mHz, 0.35 mHz, 0.4 mHz, 0.45 mHz, 0.55 mHz, 0.6 mHz, 0.65 mHz and 0.75 mHz. These can be seen most clearly in the measurement of well bore pressure, but are also clearly identifiable in the flow rate measurements. Since the amplitude of the input oscillation is known, then by measuring the amplitude of the output oscillation it is possible to determine properties of the well.

By way of an example, we can consider oil flow $F_o$, water flow $F_w$, and wellbore pressure p for wells 1, 5 and 10 (frequencies 0.1 mHz, 0.4 mHz and 0.75 mHz) and the information that can be derived from the results shown in FIG. 6. The oil and water production and the wellbore pressure can be read-out from the appropriate plot of FIG. 6, and the background noise, which can also be read-out of FIG. 6, is used to estimate the uncertainty in the value:

For well 1, $F_o$=30±14 Sm$^3$/h, $F_w$=3.7±1.5 Sm$^3$/h, p=3.3±0.7 bar.
For well 5, $F_o$=33±5 Sm$^3$/h, $F_w$=4.3±0.5 Sm$^3$/h, p=2.81±0.3 bar.
For well 10, $F_o$=31.4±2 Sm$^3$/h, $F_w$=4.2±0.2 Sm$^3$/h, p=2.74±0.01 bar.

We can then use error propagation theory to calculate water cut (WC) and productivity index (PI):
For well 1, WC=0.11±0.07 and PI=9.1±4.5 Sm$^3$/h bar
For well 5, WC=0.115±0.02 and PI=11.7±2.2 Sm$^3$/h bar
For well 10, WC=0.118±0.01 and PI=11.5±0.7 Sm$^3$/h bar It is clear that uncertainty is very high for well 1, because the uncertainty is higher at low frequencies.

The uncertainties can be reduced by extending the test period. If for instance the 6 hour test is extended to the five day test period for the equivalent build-up test, the uncertainties in the estimates are considerably lowered and the following is found:

For well 1, $F_o$=31.3±2 Sm$^3$/h, $F_w$=6.6±1.5 Sm$^3$/h, p=3.31±0.05 bar

These values are much more precise and similar improvements can be calculated for the other estimates.

It should be noted that oscillations could be applied over a longer time period than that shown in FIG. 5. For example, the oscillations could be applied for the whole period of the build-up test. A longer time period for applying the oscillations can improve the data that is obtained, but the trade-off is that production losses are increased. It is also possible to scale the oscillations, with different amplitudes for different frequencies; in particular it can be useful to increase the amplitude at lower frequencies since larger oscillations at lower frequencies can increase accuracy.

Figure 7:
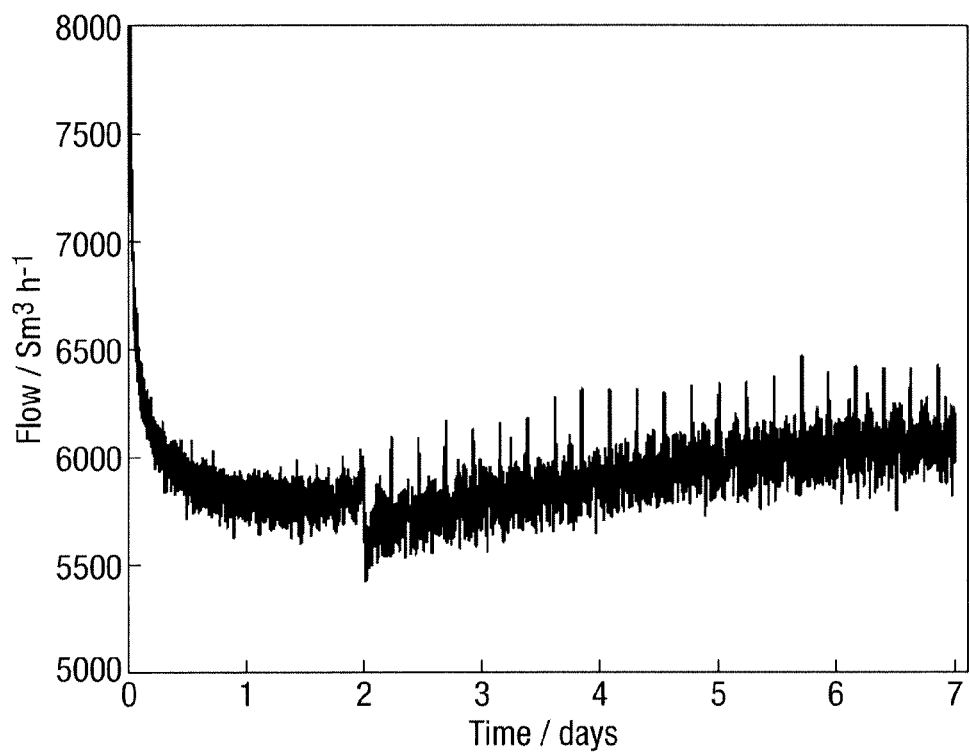
FIG. 7 is a graph derived from the oilfield simulation showing variations in production flow rate during a standard build-up well test and variations in production flow rate using oscillation input at the wells, with the addition of noise.
Figure 8:
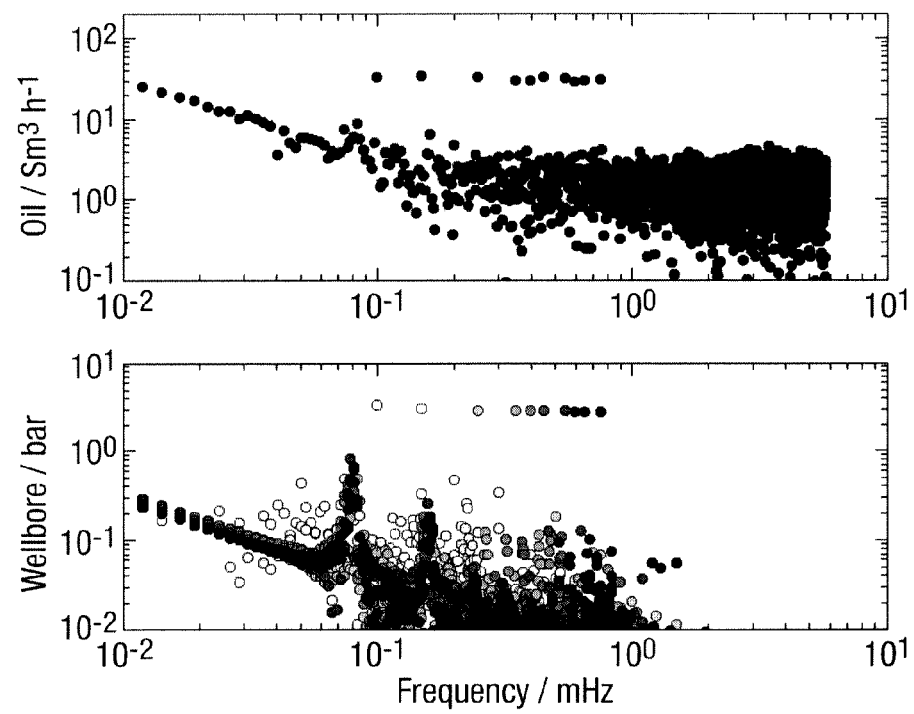
FIG. 8 shows the results of a frequency analysis of the data in FIG. 7 including wellbore pressure and flow rate.

FIG. 7 shows another set of data from the simulation in which the frequency oscillation well test is applied over a five day period. In FIG. 7, random measurement noise is added to the date in order to simulate noise that might be shown in real world data. FIG. 8 shows the output from a frequency analysis of well bore pressure and oil flow rate for the noisy data of FIG. 7. The noise generally creates additional data points at the higher frequencies, which are outside the selected frequency range for the applied oscillations and thus does not reduce accuracy of the estimates.

Other alternatives and refinements are possible, for example by following techniques proposed in WO 2013/072490 by Sinvent AS and Norwegian University of Science and Technology (NTNU). Thus, the oscillations can be applied during shut in and start up of the well without significant adverse effect. Also, a phase difference can be applied to the oscillations in order to avoid synchronisation of the peaks. A synchronisation of the peaks would undesirably increase production losses.

Figure 9:
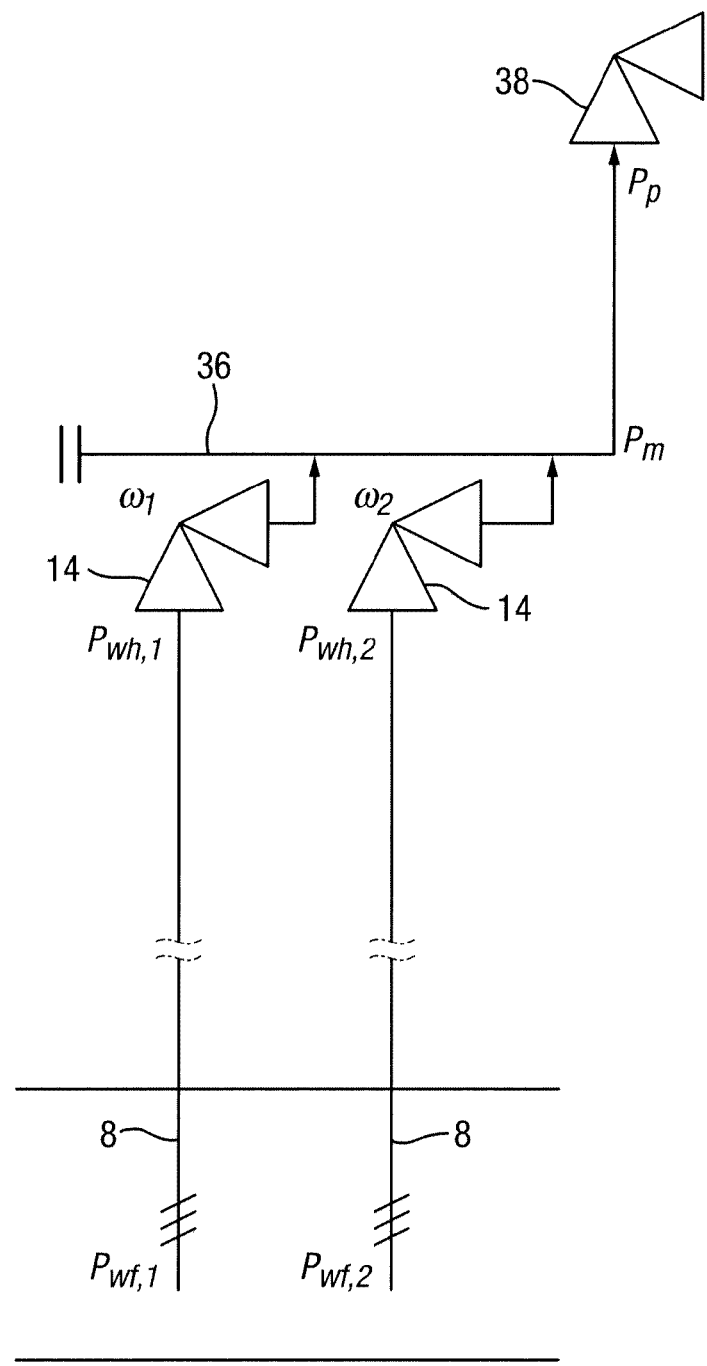
FIG. 9 shows an alternative field equipment set up

As noted above, although the simulation uses field equipment based on platform wells without a subsea manifold, it is also possible to make use of the oscillation based well test method in other equipment setups. FIG. 9 shows an arrangement with a subsea manifold 36 which connects to a platform choke 38. As with FIG. 2 only two wells 8 are shown, although naturally more wells 8 could be connected to the manifold 36. The wells 8 connect to the subsea manifold 36 via valves 14. With this arrangement when an oscillation is applied to the valves 14 a problem can arise since the manifold 36 may oscillate with both frequencies. The reason that this can arise with a subsea manifold arrangement as shown in FIG. 9 is that there is often no pressure control of the subsea manifold 36. The manifold pressure can therefore vary and it will be affected by the oscillations of the choke valves 14. Thus, when a first valve 14 is excited with the frequency $\omega_1$ and a second valve 14 is excited with the frequency $\omega_2$ then there is frequency leakage and the manifold 36 may oscillate with both frequencies $\omega_1$ and $\omega_2$. As a consequence, both wells 8 will be excited with the two frequencies and the frequency earmarking of the wells 8 is lost. This does not prevent application of the oscillation based method of well testing to set-ups using a subsea manifold, but steps have to be taken to avoid frequency leakage.

One solution is to apply pressure control to the manifold 36. Another solution is to use supersonic flow in the check valves 14. Many wells already run using supersonic flows and existing systems could be adapted to use the supersonic flow rates. With supersonic flows the pressure in the manifold will have no effect on the flow rates through the valve and any pressure variations in the manifold are essentially invisible to the valve and to the flow and pressure at the opposite side of the valve. The choke flow will be affected only by the well pressure and by the choke position. As a consequence, an oscillation can be applied which will only affect the well connected to that particular choke valve and will not leak into other wells. A more comprehensive solution, that does not require changing the flow regimes in the wells, is to account for all frequencies by means of matrix inversion. In this more general approach, the oscillation amplitudes of all test frequencies in the downhole pressure of every well is related to the oscillation are measured, and related to the oscillation amplitudes of oil, gas and/or water flow by means of the wells' productivity indices. The result is, for every test frequency, an equation in the form:

$$J^1 {}^*p_{1,i} + J_2 {}^*p_{2,i} + \ldots = F_i$$

Where $F_i$ is the oscillation amplitude in the gas, oil or water flow at frequency i, and $p_{j,i}$ is the oscillation amplitude in downhole pressure for well j at frequency i. Having measured all the oscillations $F_i$ and $p_{j,i}$, the values of the productivity indices J can be found by matrix inversion. There are also methods available in the open literature to calculate error propagation through a matrix inversion.

As noted above, the preferred embodiment is for control of a flow network and may use excitations similar to those used in the well test method described above. What is required is that the excitations create variations in measured flow parameter(s) and that the measured variations can, as an output, be analysed to determine the relationship between the input excitations and the output variations. These relationships, coupled with knowledge of the absolute values for the magnitude of the input excitations and the magnitude of the output variations, allows a model to be created that reflects how changes at the inputs affect the output(s). The data obtained by real-world excitation of control points within the flow network may be augmented by data obtained from models derived from simulations of the flow network. This can be useful in cases where excitations cannot easily be applied and/or where there would be an adverse effect on operation of the flow network if excitations were applied.

Figure 10:
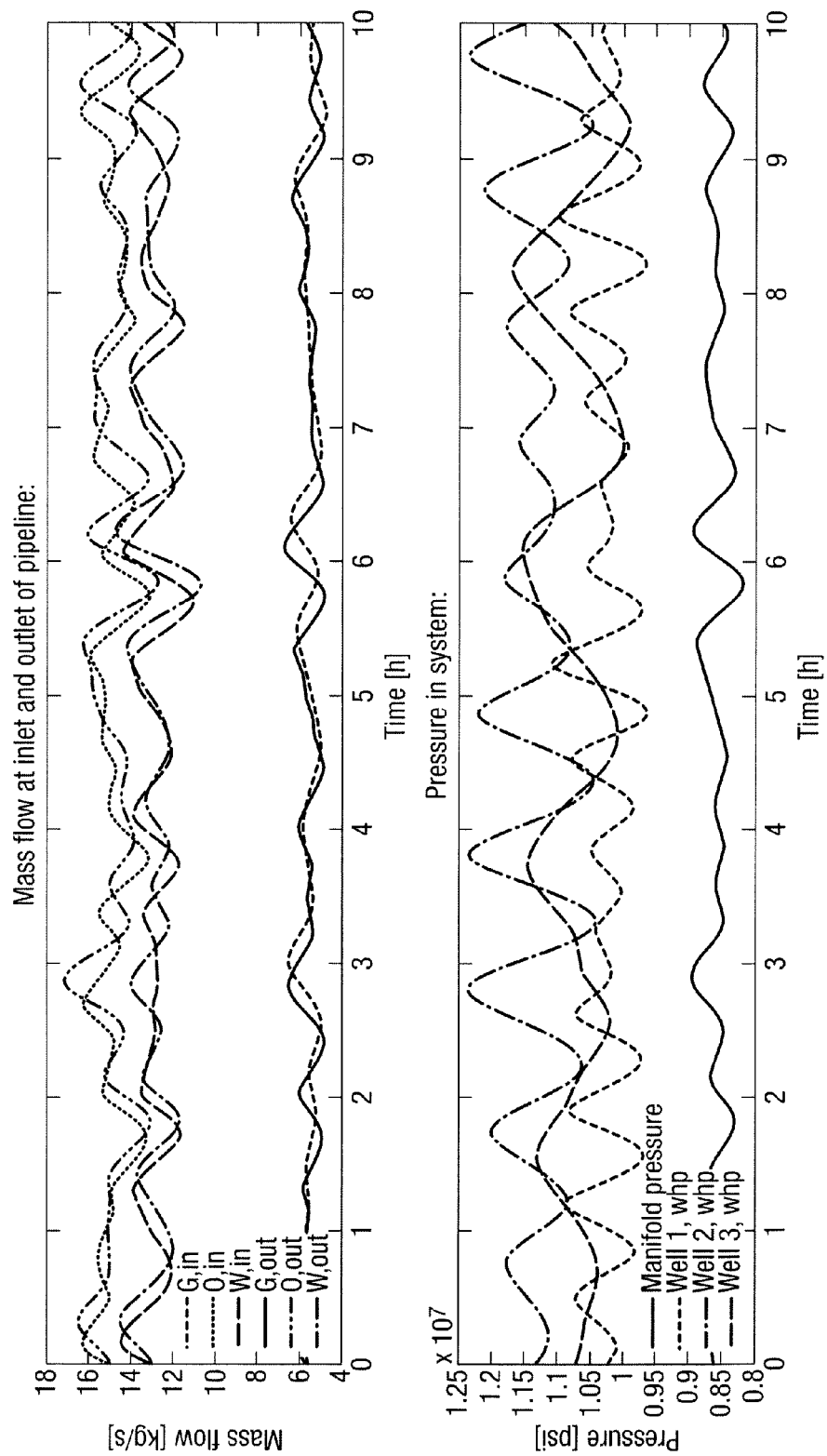
FIG. 10 shows a time series for simulated pressures in three wells and a manifold when excitations are applied at choke valves and also gas lift valves for the wells.

An example will now be described where excitations are applied to choke valves and gas lift rates in an oil and gas flow network. The simulation includes a dynamic model of three vertical wells, one manifold and one pipeline. It is required to build a local model of the flow network about the current operating point. To be able to build this local model, the control points (production chokes, gas-lift rates or valves, pump effect and so on) are excited in sinusoidal patterns with different frequencies to gain information of the systems response to changes in the input changes. It will be understood that these excitations are analogous to those used in the well test method discussed above, but are applied not only to the choke valves but also to the gas lift rates. FIG. 10 illustrates an example of simulated pressures in a simple system with oscillations applied to the system to be able to extract the necessary parameters. The sinusoidal excitations are applied at different frequencies for the different control points. The Figure shows a time series of pressures in three wells and pressure in a manifold with the combined flows (lower plot) and the resulting variations in flow rates (upper plot). Four different frequencies are used for four different control points, which in this example take the form of one choke valve and one gas-lift rate for a first well, one choke valve for a second well, and one gas-lift rate for a third well.

Figure 11:
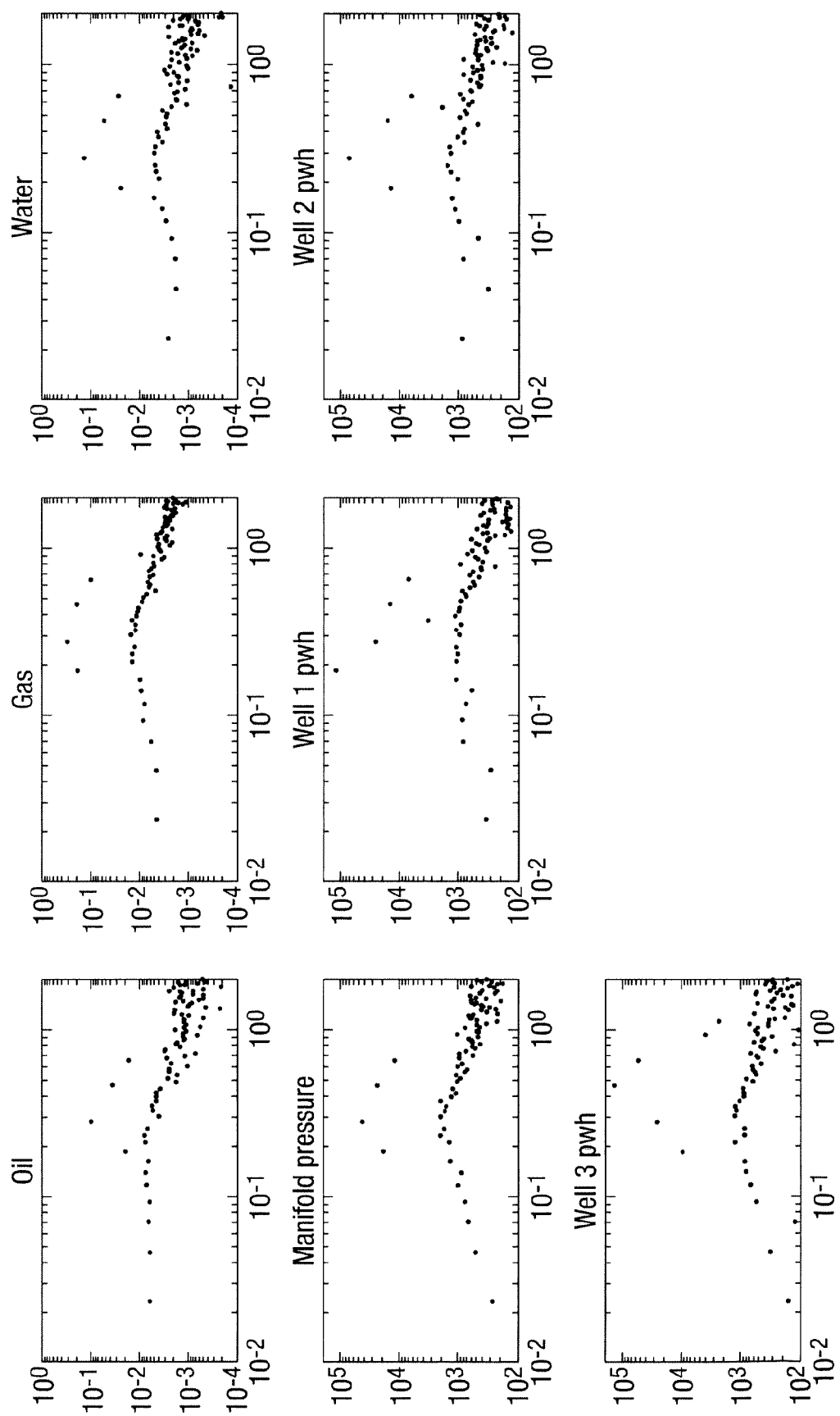
FIG. 11 shows the results of a frequency analysis of the pressure and flow measurements of FIG. 10

The fast Fourier transform is used on these time series to extract frequency information in a manner similar to that described above. The excitations, which are at 0.185 mHz, 0.278 mHz, 0.463 mHz and 0.648 mHz, are easily detectable as "four lonely points" in each frequency plot in FIG. 11. The upper three plots show measured flow rates for oil, gas and water and the other plots show pressures in the manifold and three wells.

As an example, the change in total oil flow with respect to gas-lift rate changes in well 2 (with frequency 0.278 mHz, is given by the amplitude at this frequency in the upper left plot of FIG. 21. This amplitude can be divided by the amplitude of the gas-lift rate oscillation in order to obtain a mapping between the gas-lift rate control/input variable, and the oil rate output/measurement.

Each control point is allocated a specific frequency. By using the Fourier transform of the relevant measurements (total rates, pressures, temperature, etc.), one can map the effect of a change in one particular control points/input variable to the change in all measurements.

Figure 12:
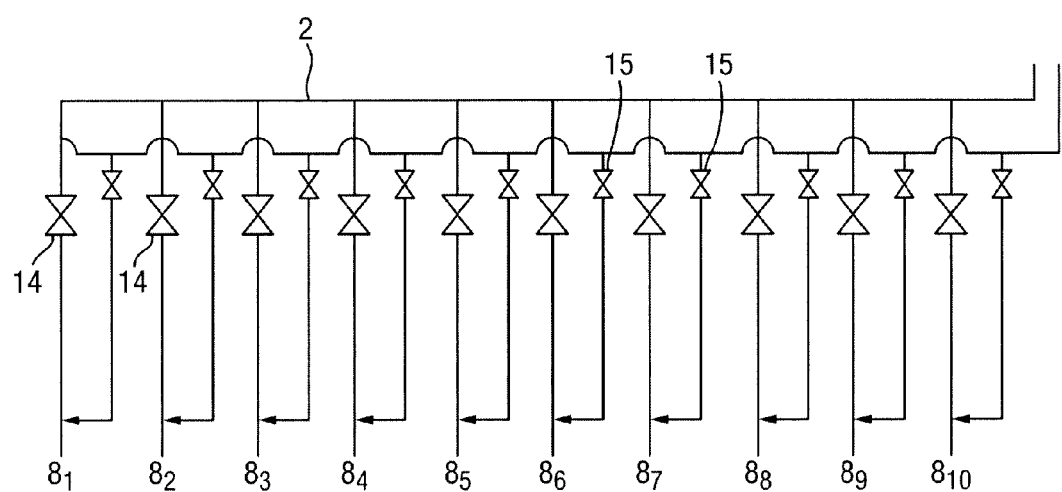
FIG. 12 is a diagram of an example flow network comprising ten production wells with a common pipeline.

For a more detailed example, consider a flow network that consists of ten production wells connected to a platform through one pipeline. The simulation includes a dynamic model of 10 vertical wells, one manifold, one pipeline and gas-lift supply. This is shown in FIG. 12. Production header 2 is connected to ten wells 8 each having a choke valve 14. A gas lift system, also connected to each of the ten wells, can apply gas lift at a rate controlled by gas lift valves 15.

In this example, wells $8_1$ to $8_4$ are high-GOR wells that produce at high rates without the use of gas lift. They might be choked back to reduce production. Wells $8_5$ to $8_8$ are low-GOR wells that need gas lift to produce, and therefore also produce with fully open choke valves. Wells $8_9$ and $8_{10}$ are wells that produce at medium rates without the use of gas lift. These wells might be choked back to reduce production, or injected with gas lift to increase production.

For this example it is assumed that we are not allowed to adjust the operating conditions for one of the wells, $8_{10}$. Due to operating conditions adjustment to the gas lift rate for $8_1$ to $8_4$ or the choke valve 14 on wells $8_5$ to $8_8$ is not relevant. Hence, in this scenario we want to find suggestions for improvement to production (meaning increased oil production) by adjustment to one or more of the choke valves 14 on wells $8_1$ to $8_4$, the gas lift rates on wells $8_5$ to $8_8$, and the choke valve 14 or the gas lift rate on well $8_9$. In accordance with the preferred embodiment, sinusoidal perturbations are added to the choke valves 14, except choke valve for well $8_4$, and gas lift valve 15, except gas lift valve of well $8_8$. However, since there are accurate simulation models for control changes to well $8_4$ and $8_8$, linear models for these wells are derived directly from simulation models. The excitations are described in the table below.

| | Amplitude (Span: 0-1, Avg: 0.7) (Well 9 Avg: 0.85) | (Avg: 1.5) (Well 9 Avg: 0.5) | Frequency (mHz) | |
|---|---|---|---|---|
| | Choke | Gas Lift | Choke | Gas Lift |
| Well 1 | 0.06 | — | 0.116 | — |
| Well 2 | 0.06 | — | 0.185 | — |
| Well 3 | 0.06 | — | 0.255 | — |
| Well 4 | — | — | — | — |
| Well 5 | — | 0.1 | — | 0.324 |
| Well 6 | — | 0.1 | — | 0.394 |
| Well 7 | — | 0.1 | — | 0.463 |
| Well 8 | — | — | — | — |
| Well 9 | 0.06 | 0.1 | 0.532 | 0.602 |
| Well 10 | — | — | — | — |

Figure 13:
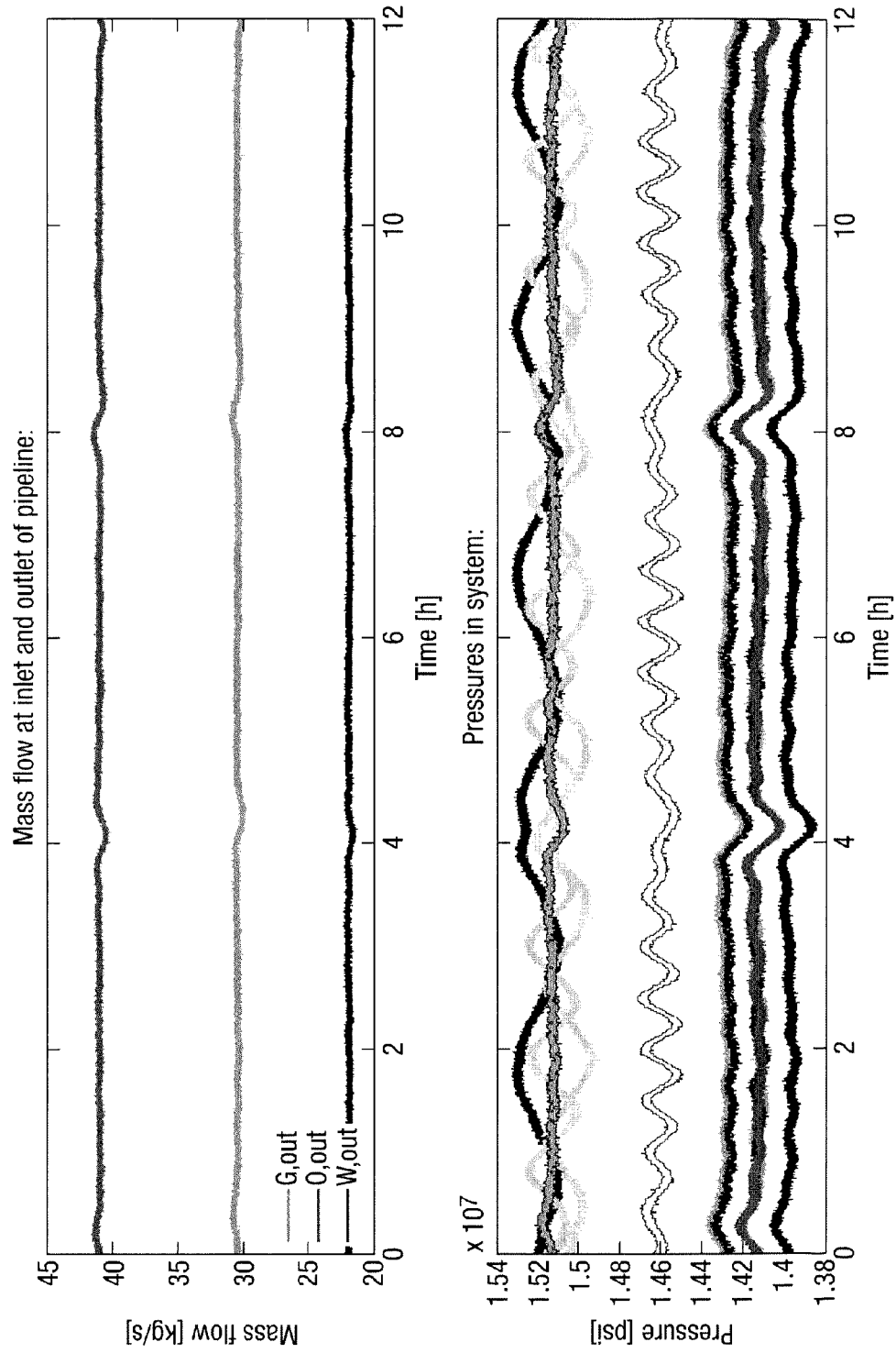
FIG. 13 shows a time series for simulated pressures in the ten wells and pipeline when excitations are applied.
Figure 14:
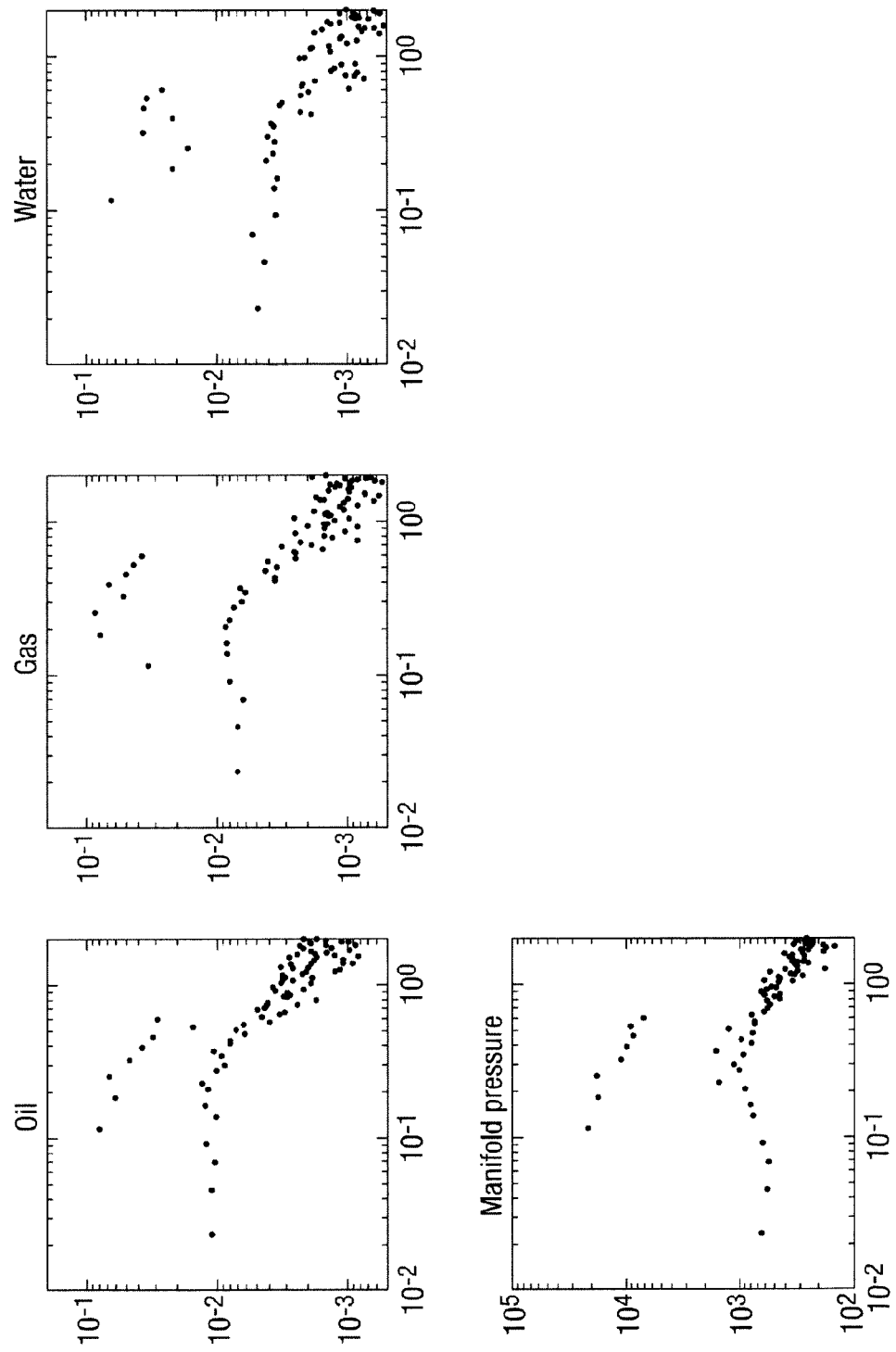

FIG. 13 illustrates the resulting variations in flow rates and pressures over a 12 hour period during the excitation of the choke and gas lift, along with the addition of simulated noise. The upper plot shows the total flow rate of oil, gas and water in the pipeline. The lower plot shows the pressures in the system including well head pressures and the manifold line (pipeline) pressure. Once again a Fourier transform is applied and the results are shown in FIGS. 14 and 15. FIG. 14 includes the oil, gas and water rates. FIG. 15 shows the manifold line pressure, and the ten well head pressures. As with the examples above it is possible to identify the effect of changes on these eight control variables, seen as eight isolated points in the Fourier plot of each measurement/output.

In order to use this data to determine what adjustments should be made to improve the performance of the flow network the analysis includes determination of parameters for a model. In this particular example, ten control points are considered. A typical flow parameter of interest in terms of improving the performance of the flow network is to maximize the oil production, which will be used as the target for this example. The model should therefore determine the impact of adjustments of the ten control points on the level of oil production.

It is necessary to know the constraints on the system. For this example it is assumed that all wells can possibly be pressure constrained and hence allow the option that all choke valves be fully open. Further, we assume that the production system has a limitation on the available gas for gas lift, and that there is a limited handling capacity on total gas and water production. Finally, the model should be limited to only suggest changes to maximum four of the control points (inputs). This keeps the model simple and also ensures that the real-world results of the proposed adjustments are more likely to follow the prediction of an improvement. Hence the model is required to find the four best control variables to change, and to determine the size of the adjustment that should be made.

To formulate the optimisation model, it is necessary to know how a (small) change in the chokes and gas lift rates will effect, 1) the total production oil, gas and water, and 2) the manifold line pressure and well head pressures, i.e. the effect of all control variables on all the measurements. Since factors such as problems with hydrates or erosion are not considered, there is no need to consider temperature measurements or computation of velocities, although it will be appreciated that such factors and measurements could be included in alternative scenarios, which are briefly commented on below.

We therefore need to compute the mapping of all control variables (inputs) to all measurements (outputs):

$A_{pi}^{RC} = A_{pi}^{R}/A_i^{C}$ Change in flow rates of phase p, due to change in control i $A_i^{MC} = A_i^{M}/A_i^{C}$ Change in manifold line pressure, due to change in control i $A_{ji}^{WC} = -A_{ji}^{W}/A_i^{C}$ Change in wellhead pressure of well j, due to change in control i $A_{ji}^{CC} = (-A_{ji}^{W} - A_i^{M})/A_i^{C}$ Change in choke pressure drop of well j, due to change in control i The input parameters $A_i^{C}$ are respectively the amplitudes that the choke valves and gas lift rates are excited with during the experiment. In this case the values are 0.06 for the choke valve of well 1, 2, 3 and 9, and 0.1 for the gas lift rate on well 5, 6, 7 and 9. Further, $A_{pi}^{R}$, $A_i^{M}$ and $A_{ji}^{W}$ are the amplitudes of the respective measurements at this frequency i, which can be obtained from the frequency plots above. The sign of the parameters is determined from the size of the phase shift. $A_{pi}^{RC}$, $A_i^{MC}$, $A_{ji}^{WC}$ and $A_{ji}^{CC}$ are their relative difference. Note that the mapping between the control points for well 4 and well 8 to all outputs are obtained from simulation models rather than experiments.

As an alternative to using sine waves and the resulting amplitudes to find the coefficients $A_{ji}$, one could use (averaged) steady state values at different input setpoints in a finite difference like computation.

Given the plant y=f(u), operating at y*=f(u*). Introduce a temporary step u=u*+Δu$_i$, giving y*+Δy$_j$=f(u*+Δu$_i$). For small Δu$_i$, this can be used to approximate the derivative df/du=A.*+Δy$_j$=y*−y=A Δu$_i$, =>A=*+Δy$_j$/Δu$_i$. These estimates of A can then be used in the same post processing as for the oscillation case.

The steps will be subject to the same "leaking" effect that occurs in the oscillation experiments, and it would be dealt with in a similar fashion.

Both the amplitude approach and the multiple steady state approach are batch processes. A more continuous approach can be imagined as well, by applying principles from online parameter estimation of a simple (linearized) model around the current operating points. Given model structure Δy$_j$=A*Δu$_i$. With Δy$_j$ and Δu$_i$ known, and A* unknown. Let A be the current estimate (or initial guess) of A*. The simplest online estimation rule is then given by the instantaneous cost gradient algorithm: dA/dt=Γ*e*Δu$_i$, where Γ is a positive gain and e is the normalized prediction error e=(Δy$_j$−A Δu$_i$)/n^2 where n is a design parameter. Time delays may be accounted for in a pre-processing stage, before the signals are feed to the estimation scheme.

With redundant information through multiple measurements and/or from simulators or models, it is possible to use weighted last squares method to decide on the model parameter.

Based on the stated goals of the model, the limitations on the system, and the mapping/relation between input and outputs, the model described below is proposed. The first table below lists all sets and their indices, while the second table gives all variables of the model. The parameters can be found in the third table, followed by the objective function and all constraints of the model.

| Index | Set | Description |
|---|---|---|
| j | J | Wells |
| i | $I^C$ | Choke control |
|  | $I^{GL}$ | Gas lift control |
| p | P | Phases |

| Variable | Description |
|---|---|
| Δu$_i$ | Choke or gas lift control variables at control point i |
| Δq$_p$ | Production rate of phase p |
| Δp$_j^W$ | Wellhead pressure at well j |
| Δp$_j^C$ | Pressure drop across choke of well j |
| Δp$^M$ | Manifold line pressure |
| x$_i$ | 1 if control point i is changed 0 otherwise |

| Parameter | Description |
|---|---|
| p$_j^W$ | Wellhead pressure of well j |
| p$^M$ | Manifold pressure |
| q$_i^{GL}$ | Gas lift rate injected at control point i |
| C$_p$ | Production handling capacity of phase p |
| q$_p$ | Production of phase p |
| C$^{GL}$ | Total gas lift capacity |
| T$_i$ | Maximum change allowed for control point i |

Note that the wells are represented by subscript j in the model, including well 10, even though its control variables are not considered for optimisation in the test case. The control/input variables are represented by index i and given by Δu$_i$, for both the change in choke openings and gas lift rates. Subscript p represents phase, i.e. oil, gas and water, or a subset of them. All variables are delta (Δ) variables, meaning that we are modelling changes from the current operating conditions.

Objective function: The objective of this example is to increase the production of oil, Δq$_o$, as much as possible.

$$\max \Delta q_o \quad (1)$$

System constraints: Total gas and water production (q$_p$) is constrained topside. But the corresponding variable in the model is not the total production rate, but the change in total production rate of gas and water. Therefore Equation (2) below restricts the changes in gas and water production rates Δq$_p$, given by their respective topside handing capacities (C$_p$) and total production rates (q$_p$). In addition, there is only a limited amount of gas lift ($\Sigma_{i \in I^{GL}} \Delta u_i$) available for distribution among the gas lift wells. In the same way as the previous equation, Equation (3) below restricts the change in amount of gas used for gas lift.

Further, the optimisation model must suggest production strategies that are pressure feasible. This is ensured through Equation (4) below, stating that the change in wellhead pressure for each well must be larger than or equal to the change in the pressure drop across the choke plus the change in the manifold pressure. This is derived from the pressure upstream the choke ($p_j^W$) having to be higher than the manifold line pressure ($p^M$).

$$\Delta q_p \leq C_p - q_p \qquad p \in \{g, w\} \qquad (2)$$

$$\sum_{i \in I^{GL}} \Delta u_i \leq C^{GL} - \sum_{i \in I^{GL}} q_i^{GL} \qquad (3)$$

$$\Delta p_j^W \geq \Delta p_j^C + \Delta p^M \qquad j \in J \qquad (4)$$

Operational constraints: It may be desirable to limit the number of changes that the model proposes. These constraints and the binary variables $x_i$ make sure that the optimisation only allows changes in four control variables. In addition, the amount by which each control variable can be changed is limited, given by $T_i$.

$$\sum_{i \in I} x_i \leq 4 \qquad (5)$$

$$-T_i x_i \leq \Delta u_i \leq T_i x_i \qquad i \in I \qquad (6)$$

$$x_i \in \{0, 1\} \qquad i \in I \qquad (7)$$

Linear system model: By exciting the system or using simulation models, we are able to map all control/input variables of interest (for example gas lift rate in well 1 is not considered in this example) to all relevant measurements/outputs. In this example changes in the choke settings and gas lift injection rates ($\Delta u_i$), are mapped to changes in total oil, gas and water rates, manifold line pressure, and well head pressures. Each of the control variables has its distinct frequency i.

$$\Delta q_p = \sum_{i \in I} A_{pi}^{RC} \Delta u_i \qquad p \in P \qquad (8)$$

$$\Delta p^M = \sum_{i \in I} A_i^{MC} \Delta u_i \qquad (9)$$

$$\Delta p_j^W = \sum_{i \in I} A_{ji}^{WC} \Delta u_i \qquad j \in J \qquad (10)$$

$$\Delta p_j^C = \sum_{i \in I} A_{ji}^{CC} \Delta u_i \qquad j \in J \qquad (11)$$

Output parameters of interest may not always be measured, if for example fluid velocity for a pipeline would be restricted to a maximum velocity due to erosion. Although the velocity usually is not measured, it could be estimated based first order physical effects and calculated as a function of flow rates, pressure and temperature. Equation (13) illustrates a velocity constraint, and equation (14) the velocity model.

$$\Delta v \leq C^v - v \qquad (123)$$

$$v = f(p_M, q, T) \qquad (14)$$

It is also possible to correct for changing or failing equipment if the information is provided automatically from a condition based monitoring system. Referring to this example, if a gas lift compressor needs to reduce speed due to high frequency vibrations, the parameter $C^{GL}$ in equation (3), is reduced in the same iterative way until the vibrations disappear. The end result is the possibility to predict, with a high degree of confidence, the results of (small) changes in the control points on the output flow parameters of interest. Thus, in this example it is possible to identify what effect adjustments on choke valves and gas lift rates will have on total production. Since only a small change to the operating point is proposed and as this is based on real-world information then the linear model will be accurate. When the required changes have been implemented (or optionally if the operator decides to make alternative changes based on their experience and judgement) then the process can be repeated. In this way it is possible to iterate toward an optimal solution whilst ensuring that the proposed adjustment never diverges significantly from a path that will provide an improvement. This is not possible with conventional simulation.

Solving this model for the example case explained previously, the model provides suggested changes to four control points in the first iteration in order to maximize the target of oil production. The tables below contain information regarding the recommended steps obtained by running the method. In the first table the four suggested control point changes are listed, note that these are all choke settings.

| Control Point | Step 1 | Step 2 | Step 3 | Step 4 |
|---|---|---|---|---|
| | Change in control point (Δ) | | | |
| Choke well 1 | | +0.15 | +0.15 | |
| Choke well 2 | +0.15 | | +0.15 | |
| Choke well 3 | +0.15 | +0.15 | | |
| Choke well 9 | +0.15 | +0.15 | +0.15 | +0.05 |
| Gas lift well 6 | −0.3 | −0.3 | −0.15 | −0.15 |

The next table gives the resulting change in the production rates, oil production being the target of the model, while gas and water production make up the capacity constraints. This clearly demonstrates that the recommended steps are in the right direction, increasing the oil production rate for each iteration. Note that at Step 4 the water has exceeded the maximum permitted and therefore although the oil production rate is higher the setting used for Step 4 are not allowed and must be changed to avoid going outside the constraint on water content.

| | Step1 | | Step 2 | | Step 3 | | Step 4 | | Step 5 |
|---|---|---|---|---|---|---|---|---|---|
| | Current | NextStep | Current | NextStep | Current | NextStep | Current | NextStep | Optimal |
| Total oil production | 39.24 | +0.40 | 39.62 | +0.22 | 39. | +0.4 | 40.12 | −0.1 | 40 |
| Gas Lift (<1.5) | 1.5 | — | 1.44 | −0.06 | 1.38 | −0.03 | 1.35 | +0.02 | 1.37 |

-continued

|  | Step1 | | Step 2 | | Step 3 | | Step 4 | | Step 5 |
| --- | --- | --- | --- | --- | --- | --- | --- | --- | --- |
|  | Current | NextStep | Current | NextStep | Current | NextStep | Current | NextStep | Optimal |
| Gas (<30) | 26.82 | +0.48 | 27.40 | +0.18 | 28 | +0.2 | 28.33 | −0.26 | 28.35 |
| Water (<20.77) | 20.77 | — | 20.65 | +0.12 | 20.66 | +0.11 | 20.84 | −0.07 | 20.75 |

In a more general context the preferred implementation for the control of the flow network is as follows. First, control points that are subject to optimisation are excited in sinusoidal patterns with distinct frequencies, or, if there exists an accurate simulation model for parts of the system, the simulator may be used instead. The frequencies may be selected to avoid interference. A Fourier transform of all relevant measurements for a suitable time period (typically the last 6-18 hours of production for oil and gas networks) is conducted to find/compute the parameters of the linearized model. A suitable time period can be determined based on the frequency spectrum and/or based on a moving horizon principle.

The model is solved to suggest changes to the production strategy. This procedure could be done every 5 minutes. The computational cost is low since the model is simple.

When it suits the production engineer, he may look at the model's suggestion for production changes. He can decide to not make any changes, implement the suggested changes, or something else. Either way, when the process is stabilized at a new operating point, and the process is excited around this operating point for 6-18 hours, a new (simple) model is developed, and the system will provide a new suggestion. Note that the preferred system provides recommendations for production changes before the system has been excited for 6-18 hours, however that recommendation would then be based on both the old and the new operating point, or with a lower quality on the parameter estimates. The process can continue in a loop to provide a continuous search for an improvement in the production strategy.

In addition to operational changes, the model could also be altered/changed to account for new information based on; high frequency data from condition based monitoring of equipment within the flow network, e.g. when compressor speed needs to be reduced due to vibrations and the gas handling capacity goes done; planned maintenance where parts of the network is out of operation, and capacities and performance is reduced.

The invention claimed is:

1. A method for control of a flow network in order to improve performance of the flow network, the method comprising:
   (a) applying predetermined excitations that include excitations with known characteristics applied sequentially at multiple control points within the flow network, wherein the multiple control points are at different branches of the flow network;
   (b) receiving measurements of changes in one or more flow parameters in one or more flow paths in which flows of more than one of the different branches have been combined;
   (c) carrying out an analysis of the flow parameter measurements to identify variations induced by the applied excitations that includes identifying the effects of the excitations based on a timing and/or frequency of the excitations;
   (d) determining an adjustment to be made at one or more of the control points in order to improve the performance of the flow network;
   (e) making the determined adjustment to the control points of the flow network or making an alternative adjustment decided upon by a flow network operator; and
   (f) repeating steps (a) to (e) one or more times to thereby iteratively improve the performance of the flow network.

2. A method as claimed in claim 1, wherein the measurements are used in the analysis of step (c) to create a model of relevant parts of the flow network and step (d) includes optimisation of the model.

3. A method as claimed in claim 1, wherein step (c) includes creating a local mathematical optimisation problem to calculate an adjustment of one or more of the control points and step (d) includes solving this optimisation problem in order to determine the required adjustment.

4. A method as claimed in claim 1, wherein step (a) includes applying excitations both to the flow network and to a simulation of the flow network or parts thereof and step (b) includes obtaining measurements from the flow network and from the simulation.

5. A method as claimed in claim 4, wherein a model obtained from the simulation is updated to take account of the adjustment made at step (e) when steps (a) to (e) are subsequently repeated.

6. A method as claimed in claim 1 wherein the excitations are oscillations applied at known frequencies, wherein the oscillations applied at different control points of the multiple control points are at different test frequencies and wherein in step (c) a frequency analysis is carried out.

7. A method as claimed in claim 1 wherein excitations are applied to more than one type of control point.

8. A method as claimed in claim 1, wherein a plurality of flow parameters are measured at step (b).

9. A method as claimed in claim 1, wherein the method includes a step of reporting the results of the analysis via a control or support system.

10. A method as claimed in claim 1, wherein the determined adjustment is presented to the operator of the flow network as a proposed adjustment in order to permit the operator to have the choice of following the proposal or applying an alternative adjustment based on the operator's judgement.

11. A method as claimed in claim 1, being used for an oil and gas production flow network, wherein the control points include control points for controlling flows and/or pressures of wells within the oil and gas production flow network, for example control points at the well heads and at a riser base.

12. A method as claimed in claim 11, wherein the control points include choke valves and gas lift rates.

13. A method as claimed in claim 1, wherein the improvement in performance of the flow network includes increasing or decreasing one or more output parameters of interest and the output parameter(s) are hence the focus of the iterative changes in step (e) and repetitions of the process.

14. A method as claimed in claim 1, wherein the improvement in performance of the flow network involves one or more of: increasing or decreasing one or more output parameter(s) of interest, increasing an accuracy of information provided by the analysis at step (c), or adjusting operational parameters of components of the flow network in order to increase a service life of those components or other components of the flow network.

15. A method for control of a flow network in order to improve performance of the flow network, the method comprising:
   (a) applying predetermined excitations at multiple control points within the flow network, wherein the multiple control points are at different branches of the flow network;
   (b) receiving measurements of changes in one or more flow parameters in one or more flow paths in which flows of more than one of the different branches have been combined;
   (c) carrying out an analysis of the flow parameter measurements to identify variations induced by the applied excitations, wherein the analysis comprises:
      executing a computation of a relationship between the excitations applied as an input at the control points in step (a) and the effect on the flow parameters measured as an output in step (b); and
      finding a ratio of an input amplitude of the excitations to an output amplitude of the resultant variation in the flow parameters;
   (d) determining an adjustment to be made at one or more of the control points in order to improve the performance of the flow network;
   (e) making the determined adjustment to the control points of the flow network or making an alternative adjustment decided upon by a flow network operator; and
   (f) repeating steps (a) to (e) one or more times to thereby iteratively improve the performance of the flow network.

16. A method as claimed in claim 15, wherein the determination of the adjustment at step (d) involves comparison of the relationships determined at step (c) to identify the adjustment that will generate the greatest improvement in performance of the flow network.

17. An apparatus for controlling a flow network to improve performance of the flow network, the apparatus comprising:
   at least one memory; and
   at least one processor coupled to the at least one memory and configured to perform, based on instructions stored in the at least one memory:
   (a) applying, through a control interface, predetermined excitations that include excitations with known characteristics applied sequentially at multiple control point means within the flow network, wherein the multiple control point means are at different branches of the flow network;
   (b) in response to the applying, receiving measurements of changes in one or more flow parameters in one or more flow paths in which flows of more than one of the different branches have been combined;
   (c) carrying out an analysis of the flow parameter measurements to identify variations induced by the applied excitations that includes identifying the effects of the excitations based on the timing and/or frequency of the excitations;
   (d) in response to the carrying out the analysis, determining an adjustment to be made at one or more of the control point means in order to improve the performance of the flow network;
   (e) making the determined adjustment to the control point means of the flow network or receiving an input indicative of an alternative adjustment from a flow network operator and making the alternative adjustment; and
   (f) repeating steps (a) to (e) one or more times to thereby iteratively improve the performance of the flow network.

18. A non-transitory computer-readable storage medium storing computer-executable instructions that, when executed, cause a processor at least to perform operations for controlling a flow network to improve performance of the flow network and comprising:
   (a) applying predetermined excitations that include excitations with known characteristics applied sequentially at multiple control point means within the flow network, wherein the multiple control point means are at different branches of the flow network;
   (b) in response to the applying, receiving measurements of changes in one or more flow parameters in one or more flow path(s) in which flows of more than one of the different branches have been combined;
   (c) carrying out an analysis of the flow parameter measurements to identify variations induced by the applied excitations that includes identifying the effects of the excitations based on the timing and/or frequency of the excitations;
   (d) in response to the carrying out the analysis, determining an adjustment to be made at one or more of the control point means in order to improve the performance of the flow network;
   (e) making the determined adjustment to the control point means of the flow network or receiving an input indicative of an alternative adjustment from a flow network operator and making the alternative adjustment; and
   (f) repeating steps (a) to (e) one or more times to thereby iteratively improve the performance of the flow network.

19. An apparatus for controlling a flow network to improve performance of the flow network, the apparatus comprising:
   at least one memory; and
   at least one processor coupled to the at least one memory and configured to perform, based on instructions stored in the at least one memory:
   (a) applying, through a control interface, predetermined excitations at multiple control point means within the flow network, wherein the multiple control point means are at different branches of the flow network;
   (b) in response to the applying, receiving measurements of changes in one or more flow parameters in one or more flow path in which flows of more than one of the different branches have been combined;
   (c) carrying out an analysis of the flow parameter measurements to identify variations induced by the applied excitations, wherein the analysis comprises:
      executing a computation of a relationship between the excitations applied as an input at the control point means in step (a) and the effect on the flow parameters measured as an output in step (b); and finding a ratio of the input amplitude of the excitations to the output amplitude of the resultant variation in the flow parameters;

(d) in response to the finding, determining an adjustment to be made at one or more of the control point means in order to improve the performance of the flow network;

(e) making the determined adjustment to the control point means of the flow network or receiving an input indicative of an alternative adjustment from a flow network operator and making the alternative adjustment; and (f) repeating steps (a) to (e) one or more times to thereby iteratively improve the performance of the flow network.

20. A non-transitory computer-readable storage medium storing computer-executable instructions that, when executed, cause a processor at least to perform operations for controlling a flow network to improve performance of the flow network and comprising:

(a) applying predetermined excitations at multiple control point means within the flow network, wherein the multiple control point means are at different branches of the flow network;

(b) in response to the applying, receiving measurements of changes in one or more flow parameters in one or more flow path(s) in which flows of more than one of the different branches have been combined;

(c) carrying out an analysis of the flow parameter measurements to identify variations induced by the applied excitations, wherein the analysis comprises:

executing a computation of a relationship between the excitations applied as an input at the control point means in step (a) and the effect on the flow parameters measured as an output in step (b); and finding a ratio of the input amplitude of the excitations to the output amplitude of the resultant variation in the flow parameters;

(d) in response to the finding, determining an adjustment to be made at one or more of the control point means in order to improve the performance of the flow network;

(e) making the determined adjustment to the control point means of the flow network or receiving an input indicative of an alternative adjustment from a flow network operator and making the alternative adjustment; and (f) repeating steps (a) to (e) one or more times to thereby iteratively improve the performance of the flow network.

* * * * *